US006230965B1

United States Patent
Dismukes

(10) Patent No.: US 6,230,965 B1
(45) Date of Patent: May 15, 2001

(54) REUSABLE CONTAINER CLOSURE

(76) Inventor: Percy W. Dismukes, 7982 Meade St. #6, Westminster, CO (US) 80030

(*) Notice: Subject to any disclaimer, the term of this patent is extended or adjusted under 35 U.S.C. 154(b) by 0 days.

(21) Appl. No.: 09/407,230

(22) Filed: Sep. 27, 1999

Related U.S. Application Data

(63) Continuation-in-part of application No. 09/024,950, filed on Feb. 17, 1998, now abandoned, and a continuation-in-part of application No. 08/892,534, filed on Jul. 14, 1997, now abandoned, and a continuation-in-part of application No. 08/709,721, filed on Sep. 9, 1996, now abandoned.

(51) Int. Cl.$^7$ ....................................................... B65D 5/42
(52) U.S. Cl. ........................ 229/125.39; 24/546; 24/561; 24/910; 292/288
(58) Field of Search ........................ 229/125.37, 125.39, 229/125.41, 126; 292/288; 24/546, 561, 563, 570, 910

(56) References Cited

U.S. PATENT DOCUMENTS

| | | | |
|---|---|---|---|
| 289,161 | 11/1883 | Stimson | 229/125.39 |
| 933,454 | 9/1909 | Hudson | 229/125.39 |
| 1,076,897 | 10/1913 | Lettre | 229/125.39 |
| 1,176,457 | 3/1916 | Jones | 292/288 |
| 1,741,039 | 12/1929 | Schaefer et al. | 292/288 |
| 2,828,905 | 4/1958 | Frizzel | 229/125.39 |
| 3,019,500 | 2/1962 | Duffin et al | 24/561 |
| 3,189,250 | 6/1965 | Haygeman | 229/125.39 |
| 3,221,977 | 12/1965 | Pollert | 229/125.39 |
| 3,276,663 | 10/1966 | Falconer | 229/125.39 |
| 3,545,801 | 12/1970 | Barsness | 292/288 |
| 3,624,673 | 11/1971 | Merchant et al. | 24/561 |
| 4,019,764 | 4/1977 | Okamura | 292/288 |
| 4,761,935 | 8/1988 | King | 24/563 |
| 5,743,461 | * 4/1998 | Timmins | 229/125.39 |

FOREIGN PATENT DOCUMENTS

| | | | |
|---|---|---|---|
| 2458725 | 6/1975 | (DE) | 229/125.39 |
| 2905069 | 8/1979 | (DE) | 229/125.41 |
| 1418255 | 10/1965 | (FR) | 229/125.39 |

* cited by examiner

Primary Examiner—Gary E. Elkins

(57) ABSTRACT

A one piece, closure for containers having a pair of upper entry-exit flaps and a pair of lower entry-exit flaps. The closure includes an upper member and a lower member with a webbed wall disposed between and attached to both the upper and lower member. In use the webbed wall is placed between the closed upper flaps. A portion of the lower member extends to the front of the webbed wall and serves as a platform for receiving a portion of the lower flap, without interference from the upper member, upon the release of the lower flap by a separate flap pull. The flap pull comprises an elongated arm having at one end a handle for gripping and at an opposite end a catch for engaging the lower flap and lifting the lower flap against the upper flaps, at which point a beveled edge of the lower member of the closure engages the catch portion of the flap pull and is inserted underneath the catch portion of the flap pull. The lower flap is then released onto the platform portion of the lower member, the flap pull is removed and the webbed wall is moved against the flap edge of the lower flap, which is sufficient to fasten the container.

19 Claims, 14 Drawing Sheets

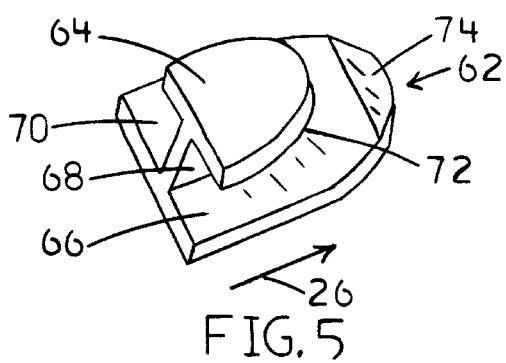
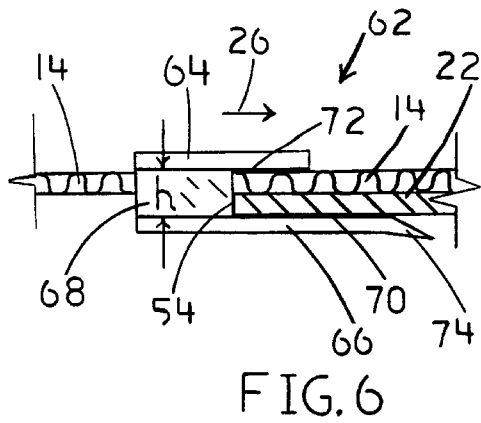
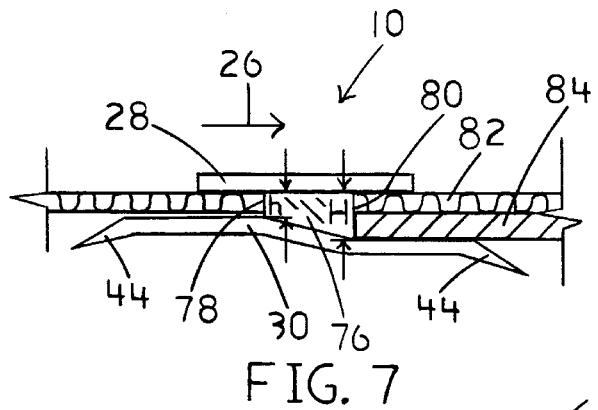
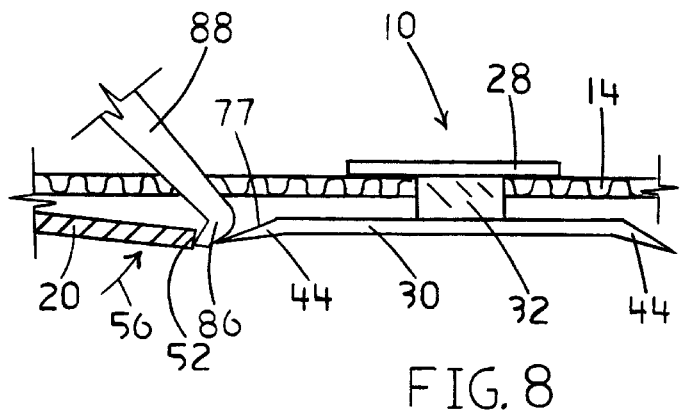
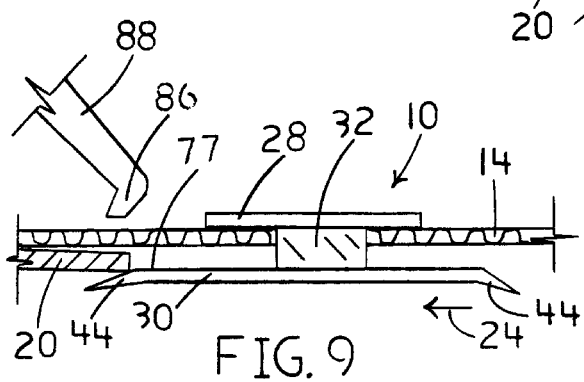

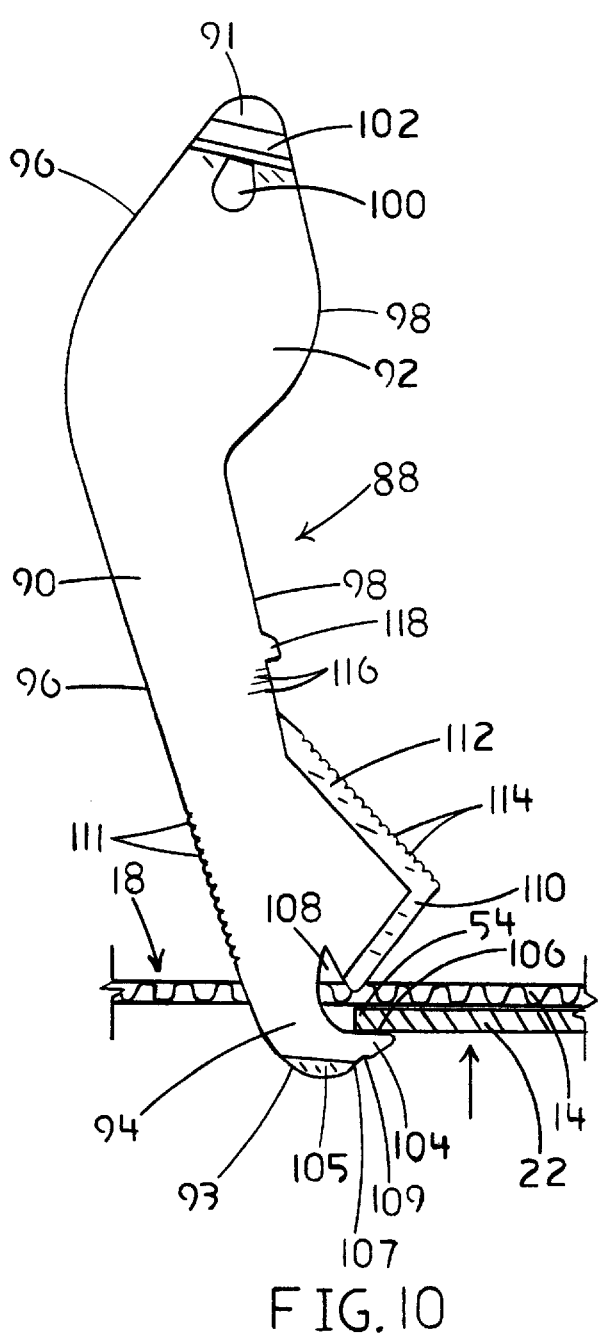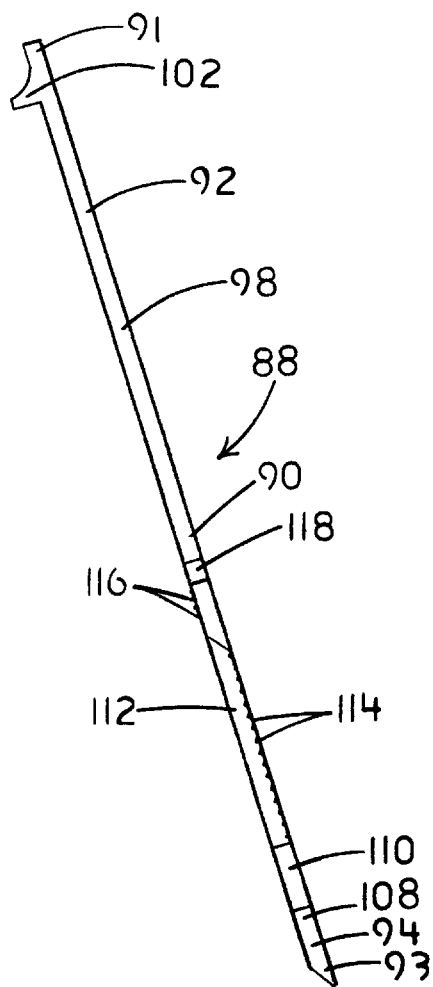
FIG. 10
FIG. 10A

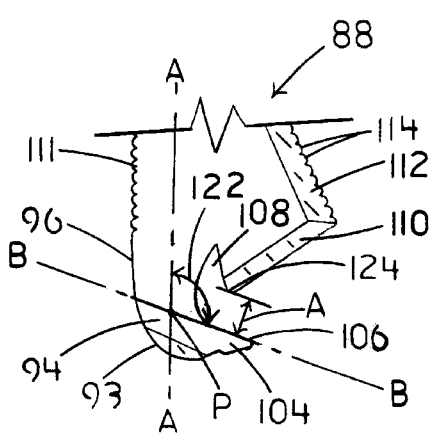
FIG. 14
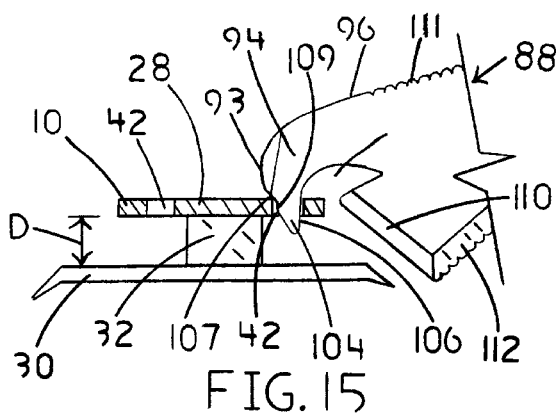
FIG. 15
FIG. 15A
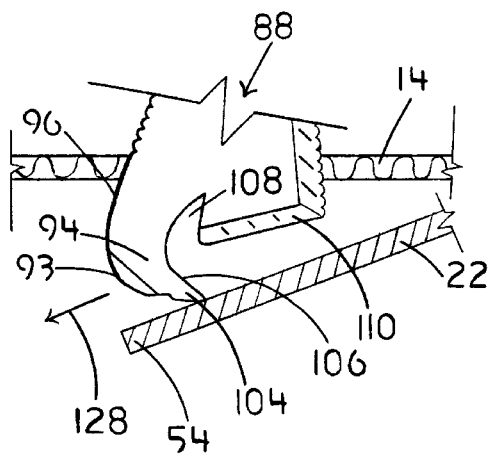
FIG. 16
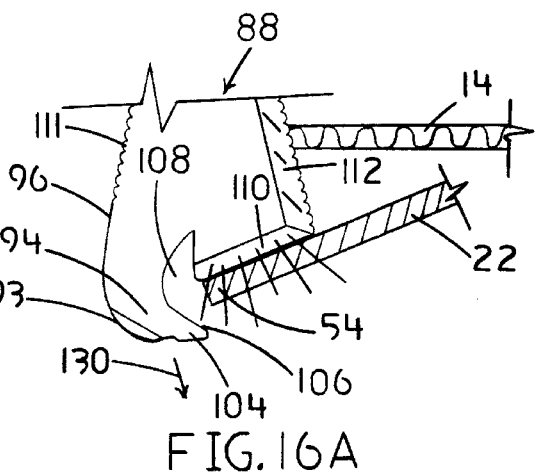
FIG. 16A

REUSABLE CONTAINER CLOSURE

This application is a continuation-in-part application of the subject inventor's application filed Sep. 9, 1996, Ser. No. 08/709,721 and having a title of "REUSABLE CONTAINER CLOSURE", now abandoned, and of the subject inventor's application filed Jul. 14, 1997, Ser. No. 08/892,534 and having a title of "FLAP PULL FOR POSITIONING A CONTAINER'S FLAP", now abandoned, and of the subject inventor's continuation-in-part application filed Feb, 17, 1998, Ser. No. 09/024,950 and having a title of "REUSABLE CONTAINER CLOSURE"abandoned.

BACKGROUND OF THE INVENTION (a) Field of the Invention

This invention relates to a device for closing containers such as cardboard boxes and the like and more particularly, but not by way of limitation, to a hand-held closure which can be used continuously for securing together upper entry-exit flaps of the container with a lower entry-exit flap.

This invention also relates to a container flap pull used with a container closure for closing containers such as cardboard boxes and the like and more particularly, but not by way of limitation, to a reusable, handheld container flap pull which can be used continuously for engaging and lifting a lower flap against a pair of upper flaps of the container.

(b) Discussion of Prior Art

Heretofore there have been a variety of different types of carton closures and box fasteners such as disclosed in U.S. Pat. No. 289,161 to Stimson, U.S. Pat. No. 933,454 to Hudson, U.S. Pat. No. 1,076,897 to Lettre, U.S. Pat. No. 1,176,457 to Jones et al., U.S. Pat. No. 2,828,905 to Frizzell, and U.S. Pat. No. 4,761,935 to King et al. In West German Patent 2,458,725 to Hauck et al., a plastic closure device for a cardboard carton is described as having a slide base plate, a guide plate and holding plates for engaging and holding upper and lower entry-exit flaps of the carton. None of these fasteners shows a one piece device having a lower member with a platform which extends from the front of a terminal edge of a webbed wall, beyond the perimeter of a parallel upper member, for the purpose of receiving a separate flap pull.

U.S. Pat. No. 3,545,801 to Barsness discloses a closure having an upper flat portion and a lower flat portion joined by a cylindrical stem, used for securing two opposite flaps of a corrugated box or the four flaps of the corrugated box. Barsness' device works by a series of turns on its axis, after each turn a container flap is lowered past the upper flat portion until all the flaps have been maneuvered in this manner, which is difficult and time consuming. Also, the Barsness device, in order to turn repeatedly with the greatest ease and efficiency, requires that the stem be cylindrical and is shown as such. The Barsness device lacks a webbed wall, which would render the device unturnable and therefore inoperable. Also lacking in the Barsness device is an overhang extending to the front of a terminal edge of the webbed wall and above the portion of the lower member that includes the platform. Openings in the overhang and the platform, which allow a portion of the overhang and the platform to be by-passed by a separate flap pull, are not included in the Barsness device.

The webbed wall of the subject invention, in addition to positively preventing the device from rotating when placed between the upper flaps, provides a structural reference and alignment means for several important features. These features include the platforms, guides for engaging open upper flaps, pull holes in the upper members, overhangs, openings in the overhangs and platforms, and beveled lips. By having the subject invention rotationally locked through the inclusion of the webbed wall, these features are positioned so as to reliably fulfill their designated functions.

The webbed wall of the subject invention further serves as a spacer or partition between the closed upper flaps. Normally, the container's closed upper flaps abut or very nearly abut. When placed between the closed upper flaps, the webbed wall forces the flaps apart a distance equal to the width of the webbed wall. This creates a space between and running the length of the upper flaps in which the webbed wall, along with the fastener, can slide back and forth unimpeded, even when the closed flaps are exerting pressure against the webbed wall. The Barsness' device lacks the means to adequately force the upper flaps fully apart to create the space between the flaps sufficient for the fastener to travel in smoothly and unimpeded. When the cylindrical stem portion of the Barsness device is placed between the closed upper flaps, a pressure from the upper flaps is exerted onto the stem. This results in the stem being partially or entirely absorbed into the flaps, so that subsequent movement of the Barsness device, other than a rotational one around the axis of its stem, is difficult. Also, since a portion of the Barsness stem is, when pressured, absorbed into the upper flaps, attempts to slide the device results in crumpling and therefore damaging the edges of the upper flaps. In addition, the webbed wall of the subject invention has a first and a second terminal edge along with a first and second side which the Barsness device lacks.

U.S. Pat. No. 3,276,663 to Falconer shows a fastening device having an upper flange and a lower flange joined by a web. The Falconer device does not show a portion of the lower member extending from the front of the terminal edge of the webbed wall, substantially beyond the perimeter of the upper member. The terminal edge for engaging a lower flap edge and extending from the upper member to the lower member of the subject invention is lacking in the Falconer device, which has a portion of a web suspended above the lower flange for engaging the top of the lower flap. Falconer lacks an opening in the overhang and the platform for receiving a separate flap pull. Also the Falconer device requires that a slot be die cut into the container to receive the device, whereas the subject invention requires no special alteration of the container in order to work.

None of the above mentioned patents disclose the unique features, structure and function of the subject container fastener and pull used with the fastener as described herein.

SUMMARY OF THE INVENTION

In view of the foregoing, it is a primary object of the present invention to provide a container closure which can be used quickly and easily with different sizes and shapes of container for securing access to the interior of the container.

Another object of the container closure is it is reusable, durable in construction, simple in design and economical to manufacture and can be made in different sizes, shapes and colors.

Still another object of the closure is to encourage the reuse of containers to reduce waste. Also the container closure eliminates the use of different types of tape and adhesives in securing the flaps of a container.

Yet another important feature of the closure is the connector between the upper member and the lower member may vary in height to accommodate container flaps of different thicknesses. Also the closure can be designed to slide in both directions in the space between the upper flaps for securing the two upper flaps with a lower flap or in a single direction for securing the two upper flaps with a lower flap.

The subject invention is used with containers having a pair of upper entry-exit flaps and a pair of lower entry-exit flaps. The closure includes a flat planar upper member parallel to a flat planar lower member. A length of the upper member is disposed at right angles to the length of the lower member. The upper and lower member may be substantially the same size and geometric shape and attached together by a connector of different sizes and shapes. The upper member overlaps on top of the container's two upper flaps and the lower member overlaps under one of the container's lower flaps holding them firmly together for preventing the flaps from opening. The connector is dimensioned to fit into a space between parallel edges of the upper flaps when the upper flaps are in a closed folded position. The connector may have different heights to accommodate different thicknesses of flaps. The container closure may be made to slide in both directions along the space between the folded upper flaps or slide in a single direction. The closure also includes a downward-turned leading lip formed into the lower member to facilitate the positioning of one of the lower flaps against the two upper flaps and into an area between the upper and lower members. The closure may be made of a sturdy material such as hard plastic and the like so that it can be used repeatedly without breaking.

In view of the foregoing it is a primary object of the present invention to provide a container flap pull which can be used quickly and easily for engaging and lifting a lower flap against the bottom of upper flaps when using a container closure in securing the container.

Another object of the container flap pull is it is reusable, durable in construction, simple in design and economical to manufacture. The pull may be made to universally fit different sizes and shapes of containers.

Still another object of container flap pull used with a container closure is to encourage the reuse of various types and shapes of containers and boxes to reduce waste.

Yet another object of the container flap pull is the pull can incorporate a number of additional features such as a handle with a combination stop/thumb grip, a notch saw, a gauge with stop, a spreader bar with cleats, and like features used in opening and closing containers, boxes and various types of receptacles.

The subject invention includes an elongated arm with one end having a catch formed therein and an opposite end with a handle. The arm may be of sufficient length for different sizes and shapes of containers. The catch is designed to engage a flap edge of a lower flap and by lifting the pull upwardly, the lower flap likewise is moved upwardly until it engages a bottom of the upper flaps. At this time, a lower member of the container closure is used to engage a rounded portion of the catch and rotate the catch upwardly releasing the pull from the lower flap. At the same time the pull is released, the lower member of the container closure engages a bottom of the lower flap and compresses the lower flap against the upper flaps. The width of the pull is dimensioned for receipt in a space between opposite flaps edges of the upper flaps when the upper flaps are folded and in a closed position on the container. The pull also includes a "V" shaped nose, a catch opening, a notch saw, a spreader bar with cleats, a combination handle stop/thumb pull, gauge for measuring width of flaps along with other features used in conjunction with the opening, the closing and securing of different types of containers.

The subject closure is one piece and includes an upper member and a lower member joined by a webbed wall. The webbed wall has a first side and a second side. Also included in the webbed wall are a first terminal edge and a second terminal edge ocurring at opposite ends of the webbed wall. The upper flaps of the container normally abut, or very nearly abut, one another. When the subject fastener is inserted between the container's closed upper flaps, the webbed wall forces the upper flaps apart by a distance normally equal to the width of the webbed wall and creates a space between and running the length of parallel flap edges. The pressure from the upper flaps resulting from being forcibly parted is applied to the sides of the webbed wall. By spreading this pressure, which is a fixed quantity, along the length of the webbed wall, the webbed wall along with the fastener is easily moved along, back and forth, in the opening, without damaging the upper flaps. The webbed wall also serves to rotationally lock the fastener, when in use, between the closed upper flaps, thus positively preventing the container closure from turning. This enables the various features such as the platform, guide, pull holes, terminal edges, overhangs, openings in the overhangs and beveled lips to be positioned in relation to the webbed wall to reliably fulfill their designated functions, which would prove impossible if the container closure were subject to random turning.

The upper member of the present invention is encompassed by a perimeter. The perimeter of the upper member has an imaginary geometric plane perpendicular to the plane of the upper member, which may intersect a portion of the lower member. Likewise, the lower member is also encompassed by a perimeter. The perimeter of the lower member also has an imaginary geometric plane perpendicular to the plane of the lower member, which may intersect a portion of the upper member. The portion of the lower member extending forward from either terminal edge of the webbed wall, beyond the plane of the perimeter of the upper member, is a platform. The platform is necessary for catching the lower flap as the lower flap is released from the pull.

The upper and lower members of the present invention may be divided by an imaginary geometric plane of a centerline running lengthwise through the center of the webbed wall, through the upper and lower members and beyond. The plane of the centerline is normally perpendicular to the planes of both the parallel upper and lower members of the subject closure. Thus the upper and lower members are divided into a first half and a second half. Each half of the lower member has along its perimeter a farthest point measured perpendicularly from the plane of the centerline. That portion of the upper member extending outwardly from either side of the webbed wall, past the farthest point on either half of the lower member, is a guide. The guide is useful in engaging an open container flap and drawing the flap to in between the upper and lower members as the subject container closure is lowered into position between the upper flaps.

An overhang may be included in the upper member and extend from the terminal edge of the webbed wall forward. When in use, the terminal edge of the webbed wall is positioned against the edge of the container's lower flap. A portion of the lower member, including the platform, is positioned underneath and against the bottom of the container's lower flap. The fastener's upper member is positioned atop the container's upper flaps. The overhang is that portion of the upper member resting against the top of the closed upper flaps and projecting over the container's lower flap. In this manner the terminal edge of the webbed wall, along with the overhang and the portion of the lower member underneath the lower flap, all work together to form a type of clamp holding the upper flaps and the lower flap tightly together, which is sufficient to fasten the container.

The overhang may include an opening for receiving the separate flap pull, thus allowing the flap pull to by-pass a portion of the overhang. In this way the platform may also include a portion of the lower member corresponding to a portion of the upper member.

The upper and lower members are normally flat and planar. The plane of the fastener's upper member is normally parallel to the plane of the lower member. The webbed wall is normally attached to the approximate center of the plane of the upper member and simultaneously to the approximate center of the plane of the lower member. The plane of the length of the webbed wall is normally perpendicular to both the plane of the upper member and the plane of the lower member. The lower member has at opposite ends a pair of beveled lips which normally extend to below the lower member. The beveled lips are an aid in engaging a lower flap edge or a portion of the flap pull, resulting in a smooth transition onto the lower member.

These and other objects of the present invention will become apparent to those familiar with container closures and box fasteners from the following detailed description, showing novel construction, combination and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 5 is a perspective view of another embodiment of the container closure. This container closure is designed to be moved in one direction along the space between the folded upper flaps and engaging the two upper flaps with the lower flap.

FIG. 6 is a side view of the container closure shown in FIG. 5 with the closure shown engaging the lower flap against one of the upper flaps.

FIG. 7 is a side view of the container closure having a connector with one side of the connector designed for receiving one thickness of upper and lower flaps and an opposite side of the connector designed for receiving a different thickness of upper and lower flaps.

FIG. 8 is similar to the view of the closure shown in FIG. 3 and illustrates the use of a hook end of a container flap pull used to lift a lower flap.

FIG. 9 is similar to FIG. 8 with the flap pull removed from the lower flap and the lower flap received on top of the lower member of the container closure.

FIG. 10 is a side view of the subject container flap pull received in a space between the upper entry-exit flaps of a container with a flap engaging catch arm of a catch received under a flap edge of a lower entry-exit flap and lifting the lower flap upwardly against the upper flaps. The lower flap is shown in cross section.

FIG. 10A is a front view of the container flap pull as shown in FIG. 10 and illustrating a typical width of the pull.

FIG. 14 is a side view of the lower portion of the container flap pull showing a center line along the length of the pull. Also shown is an angle in a range of 80 to 140 degrees of a flap pull arm, which is part of the catch, with the center line of the pull.

FIG. 15 is a side view of the lower portion of the container flap pull with a "V" shaped nose, which is part of the catch, received in a guide hole in an upper member of the container closure.

FIG. 15A is a side view of the lower portion of the container flap pull with the "V" shaped nose in a locked position in the guide hole in the upper member of the container closure.

FIG. 16 is a side view of the container flap pull with the "V" shaped nose sliding downwardly on top of a lower flap of the container.

FIG. 16A is similar to FIG. 16 and is a side view of the lower portion of the container flap pull with the "V" shaped nose sliding off of the top of a lower flap of the container and a beveled stop engaging the top of the lower flap and indicating that the catch is in position for engaging the flap edge of the lower flap.

FIG. 24 is a top view of the closure.

FIG. 25 is a top view of the closure.

FIGS. 26–27A are side views of the closure and a portion of the flap pull and sectional views of a portion of the container.

DESCRIPTION OF THE PREFERRED EMBODIMENTS

Figure 1:
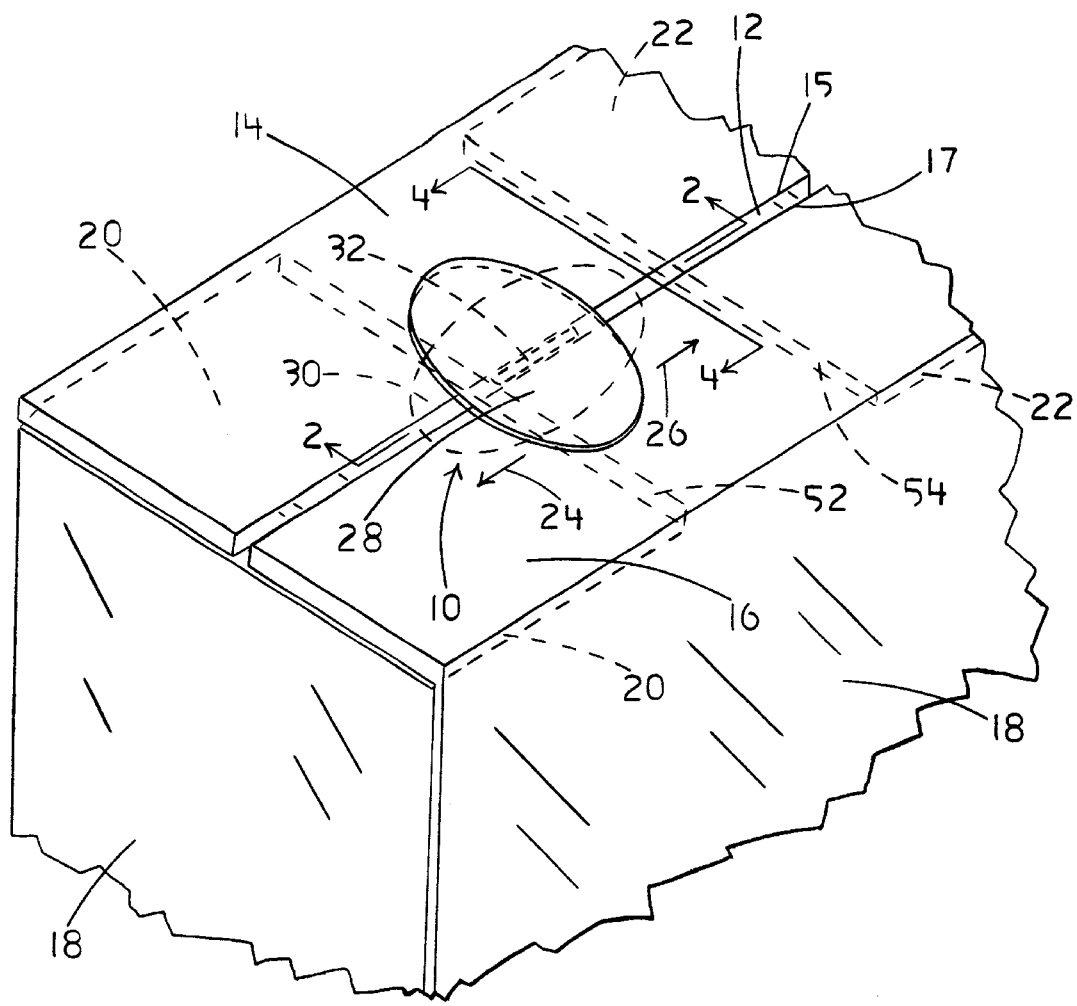
FIG. 1 is a perspective view of the subject container closure received in a space between the upper entry-exit flaps of a container and engaging and securing together the upper flaps and a lower entry-exit flap.

In FIG. 1, a perspective view of the subject container closure, having a general reference numeral 10, is received in a space 12 between a first upper entry-exit flap 14 with flap edge 15 and a second upper entry-exit flap 16 with flap edge 17 of a container 18. Only an upper portion of the container 18 is shown in the drawing. The container 18 also includes a first lower entry-exit flap 20 and a second lower entry-exit flap 22 disposed below the upper flaps 14 and 16. The lower flaps 20 and 22 are shown in dotted lines.

The subject container closure 10 is designed to engage and secure together the upper flaps 14 and 16 with the first lower flap 20 as shown in FIG. 1 or in the alternative engage and secure the upper flaps 14 and 16 with the second lower flap 22. The container closure 10 is designed to slide along the length of the space 12 in a first direction as indicated by arrow 24 when engaging the first lower flap 20 or slide in a second and opposite direction as indicated by arrow 26 when engaging the second lower flap 22. Engagement of either the first lower flap 20 with the upper flaps 14 and 16 using the subject closure 10 or the second lower flap 22 with the upper flaps 14 and 16 using the closure is sufficient to secure the container in a closed position as shown in the drawing.

The width of the space 12 is determined with the upper flaps 14 and 16 in a closed folded position as shown in FIG. 1. The width of the space 12 may vary from 1/32 to 1/2 inches or greater depending on the size and shape of the container 18. The container 18 may be a corrugated box or any other type of receptacle having upper and lower flaps used for exit and entry therein.

Figure 1A:
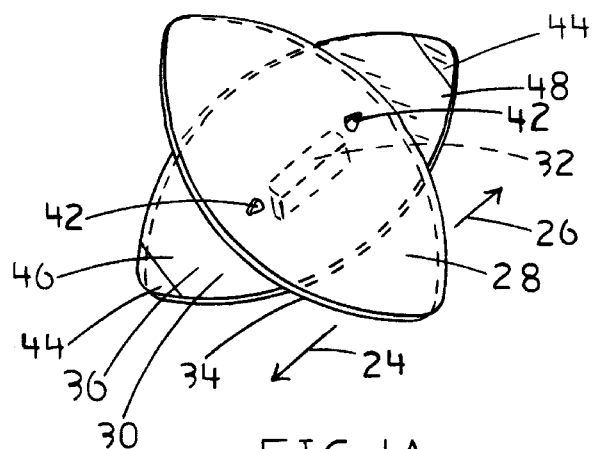
FIG. 1A is a perspective view of the container closure. The container closure is designed to slide in both directions along the space between the upper flaps.

In FIG. 1A a perspective view of the structure of the container closure 10 is shown. The container closure 10 broadly includes a flat planar upper member 28, a flat planar lower member 30 and a slide connector 32 disposed between and attached to a bottom surface 34 of the upper member 28 and a top surface 36 of the lower member 30. The length of the upper member 28 is disposed at right angles to the length of the lower member 30. The slide connector 32 in this drawing is shown in dotted lines.

The upper member 28 also includes a pair of pull holes 42 used for receiving a hook end of a pull for guiding the closure when securing the upper flaps with a lower flap. The pull is partially shown in FIGS. 8 and 9.

The lower member 30 is characterized by having downwardly turned leading lips 44 at one end 46 and at an opposite end 48 of the lower member 30. The leading lips 44 are used to engage an edge of the first and second lower flaps 20 and 22 which is discussed under FIG. 3.

Figure 2:
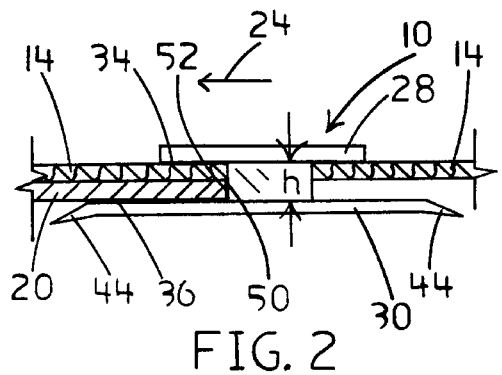
FIG. 2 is a sectional view of the container and a side view of the container closure taken along lines 2—2 as shown in FIG. 1.

In FIG. 2, a sectional view of the container 18 and a side view of the container closure 10 is shown taken along lines 2—2 as seen in FIG. 1. In this view, the first upper flap 14 and the first lower flap 20 are shown received against each other in a secured position between the top surface 36 of the lower member 30 and the bottom surface 34 of the upper member 28. The engagement of the second upper flap 16 by the closure 10 is not shown in this drawing. In this closed position, a first leading edge 50 of the slide connector 32 engages a flap edge 52 of the first lower flap 20. The flap edge 52 of the first lower flap 20 along with a flap edge 54 of the second lower flap 22 is shown in FIG. 1. The first leading edge 50 of the slide connector 32 is important in guiding the closure 10 along the space 12 in the direction as indicated by arrow 24. Note the slide connector 32 is elongated along the length of the space 12 between the flap edges of the upper flaps 14 and 16. This feature of the slide connector 32 provides for ease in sliding the closure 10 in either the direction of arrow 24 or the direction of arrow 26.

The slide connector 32 shown in FIG. 2 has a height of "h". This height is important since "h" must be sufficient to receive the thickness of either the first upper flap 14 or second upper flap 16 and the thickness of the first lower flap 20. Likewise, if the closure 10 is moved from left to right as indicated by arrow 26 and the closure 10 is used for securing the upper flaps 14 and 16 to the second lower flap 22, the height "h" must be sufficient to receive the thickness of either the first upper flap 14 or the second upper flap 16 and the thickness of the second lower flap 22.

Figure 2A:
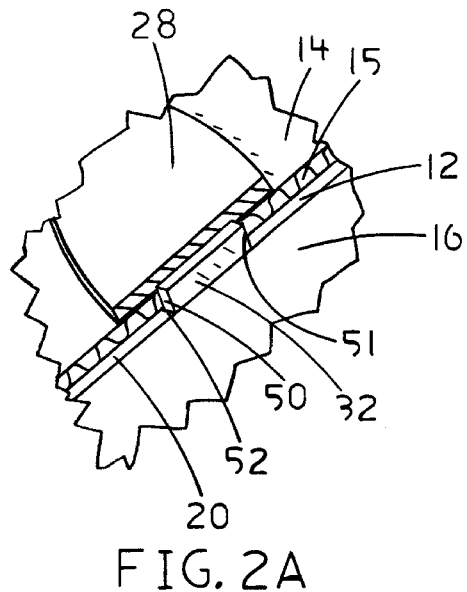
FIG. 2A is a perspective view of the container closure with the upper member cut away to illustrate the slide connector received in the space between the upper flaps and engaging an edge of the lower flap.

In FIG. 2A, a perspective view of a portion of the container closure 10 is shown with the upper member 28 cut away to expose the slide connector 32. In this view the slide connector 32 is seen received in the space 12 with its leading edge 50 received against the flap edge 52 of the first lower flap 20. The slide connector 32, in this illustration, includes a trailing edge 51 which would become a leading edge when the container closure 10 was moved along the space 12 in the direction of arrow 26 for engaging the upper flaps 14 and 16 with the second lower flap 22.

Figure 3:
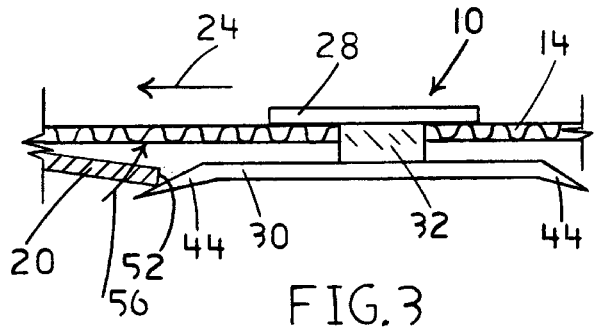
FIG. 3 is a sectional view of the container and a side view of the container closure initially engaging the lower flap prior to securing the lower flap next to the two upper flaps as shown in FIG. 2.

In FIG. 3 is a sectional view of the container 18 and a side view of the container closure 10 is shown with the leading lip 44 of the lower member 30 initially engaging the flap edge 52 of the lower flap 20. The leading lips 44 on the lower member 30 are designed to aid in engaging and lifting upwardly as indicated by arrow 56 the lower flaps 20 and 22 when the flaps extend downwardly into the interior of the container 18. obviously, if the lower flaps 20 and 22 extend downwardly in the interior of the container 18 a distance too great to be engaged by the leading lips 44, a flap pull will be used to pull the lower flaps upwardly and in conjunction with the use of the closure 10.

Figure 4:
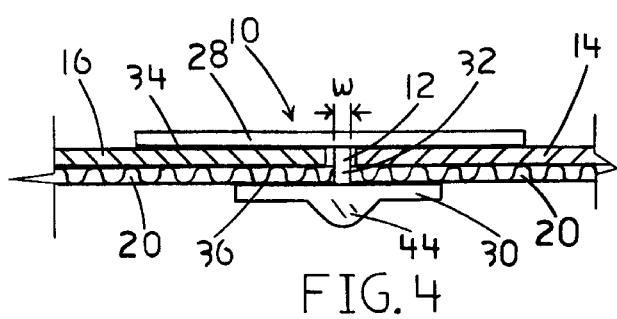
FIG. 4 is a sectional view of the container and an end view of the container closure taken along lines 4—4 as shown in FIG. 1.

In FIG. 4 is a sectional view of the container 18 and an end view of the container closure 10 is shown taken along lines 4—4 as seen in FIG. 1. Note in this view the slide connector 32 having a width "w". The width "w" is sized to be received inside the space 12 between the folded upper flaps 14 and 16. The width "w" may vary depending on the size and shape of the container and the space provided between the folded upper flaps. In this view the upper flaps 14 and 16 are received against the bottom surface 34 of the upper member 28. The top of the first lower flap 20 is received against the bottom of the flaps 14 and 16 and against the top surface 36 of the lower member 30.

In FIG. 5 is a perspective view of another embodiment of a container closure is shown and having a general reference numeral 62. This container closure 62 is designed to be moved in one direction along the space 12 while the container closure 10 is bidirectional. The closure 62 includes a flat planar upper member 64, a flat planar lower member 66 and a slide connector 68 disposed between and attached to a bottom surface 72 of the upper member 64 and a top surface 70 of the lower member 66. The lower member 66 includes a downwardly leading lip 74 for use in engaging flap edges 52 or 54.

In FIG. 6, a side view of the container closure 62 is shown engaging the lower flap 22 and the upper flap 14 between the upper member 64 and the lower member 66 with the slide connector 68 resting against the flap edge 54 of the second lower flap 22. In this drawing, the slide connector 68 has been moved along the space 12 of the container 18 in a direction of arrow 26 until the leading lip 74 engages the flap edge 54 and moves the second lower flap 22 upwardly compressing a portion of the lower flap against the bottom of the upper flaps 14 and 16 and securing the flaps together in a locked position as shown in FIG. 6. Obviously, if the container closure is turned 180 degrees it can be inserted under the upper flaps 14 and 16 and moved in a direction of arrow 24 until the leading lip 74 of the lower member 66 engages the leading edge 52 of the first lower flap 20.

In FIG. 7 is a side view of the container closure 10 is shown having a slide connector 76 having first leading edge 78 with a height of "h" and a second leading edge 80 with a height of "H". The height "H" being greater than height "h". The container closure 10 with the slide connector 72 having two different heights allows for engagement of upper and lower flaps having different thicknesses.

In this figure, the second leading edge 80 has been moved in the direction of arrow 26 with the lower member 44 and the upper member 28 receiving an upper flap 82 and a lower flap 84 therebetween. The flaps 82 and 84, in this example, have a greater thickness than the upper flaps 14 and 16 and the lower flaps 20 and 22 as shown in FIG. 1. By moving the container closure 10 in the opposite direction of arrow 26, the closure 10 can be used for engaging upper flaps 14 and 16 and the lower flap 20 as shown in FIGS. 2 and 4.

FIG. 8 is similar to the view of the closure 10 shown in FIG. 3. In this drawing, a hook end 86 of a container flap pull 88 is shown engaging the flap edge 52 of the first lower flap 20. The flap pull 88 used for lifting the lower flaps 20 and 22. Since the lower member 30 is at right angles to the upper member 28, a top portion 77 of the lower member 30 extends outwardly from the upper member 28 and provides a platform for receiving and resting the hook end 86 of the flap pull 88 thereon. When the hook end 86 has engaged the lower flap 20 and raised the lower flap 20 as indicated by arrow 56, the lower flap 20 is released by the flap pull 88. At this time, the flap edge 52 is now received on the top portion 77 of the lower member 30 as shown in FIG. 9. As the closure 10 continues to move from right to left as indicated by arrow 24, the flap edge 52 will come to rest against the connector 32 as shown in FIG. 2.

In FIG. 10, a side view of the subject container flap pull is shown having a general reference numeral 88 and received in the space 12 between the upper entry-exit flaps 14 and 16 of the container 18. The container 18 also includes lower entry-exit flaps 20 and 22. The flap pull 88 is designed to engage and lift the lower flap 20 or 22 and raise the flap 20 or 22 against the bottom of the upper flaps 14 and 16.

Broadly the unique flap pull 88 includes an elongated pull arm 90 and an upper portion of the pull 88 including a rounded upper end 91 with a bulbous shaped handle 92. A lower portion of the pull 88 includes a catch 94 with a rounded lower end 93. The pull 88 includes a first edge 96 and a second edge 98 running the length of the pull. By wrapping the fingers around the second edge 98 and against one side of the handle 92 with the thumb resting along the side of the handle 92 or along the length of the first edge 96, and forcefully pressing the first edge 96 next to the handle 92 into the palm of a hand, a firm non-slip grip of the flap pull 88 is established.

In operation, the bulbous handle 92 when in use spreads the force on the pull 88 with less fatigue and allows for precise manipulation when using the subject tool. Also, because of the thinness of the handle 92, it is important to spread the force of gripping the handle 92 over as large a surface area as feasable to avoid painful pressure of the handle's edge against the hand. In addition, the bulbous shape of the handle 92 allows for maintaining a firm grip with the handle 92 when being held in an opposite hand or upside down.

The rounded upper end 91 of the pull 88 also includes a hole 100 therethrough for use in hanging the pull 88 on a storage hook or the like. Referring now to FIG. 10A, the upper end 91 includes an outstanding storage stop/thumb grip 102 which protects the pull 88 from being lost inside the container 18 when the pull 88 is inserted between the upper flaps 14 or 16 and lower flaps 20 or 22 during storage and also serving as a thumb grip when removing the pull 88 from storage.

The catch 94 includes the rounded lower end 93 along a lower portion of first edge 96 and a "V" shaped nose 104 formed in a lower portion of the second edge 98. One side of the "V" shaped nose 104 includes a portion of the rounded lower end 93 and the other side of the nose 104 includes a flap arm 106. The catch 94 also includes a catch opening 108 next to nose 104. The angle of the length of the flap arm 106 with a center line through the length of the pull 88 is important and is discussed in detail under FIG. 14. The catch opening 108 has roughly a "C" shape. The catch 94 further includes a bevel 105 along the circumference of the rounded lower end 93 and a curb 107 and bumper 109 formed in the lower end 93. The bevel 105 is used for ease in inserting the pull 88 between the upper and lower flaps during storage or when cutting tape on the container 18. The curb 107 and beeper 109 used in conjunction with the "V" shaped nose 104 are discussed in detail under FIGS. 15 and 15A.

Disposed above the catch 94 and along the second edge 98 of the pull 88 is a beveled stop 110. Next to the beveled stop 110 is a beveled spreader bar 112 with a plurality of cleats 114 along the length of the bar 112. The spreader bar 112 is discussed in detail under FIG. 17. The beveled stop 110 is discussed in detail under FIGS. 16 and 16A.

Above the spreader bar 112 and along the second edge 98 is a calibrated flap thickness gauge 116 with gauge stop 118, where each calibration approximates ½ a distance "D" between the upper and lower members 28 and 30 of its corresponding closure 10. Distance "D" is shown in FIG. 15. It should be kept in mind that the size of the closure 10 will vary for different sizes and shapes of containers and therefore distance "D" will vary. The gauge 116 is used by placing one of the container's flaps next to the gauge stop 118 and measuring the thickness of the flap. For example, the calibrations of gauge 116 will indicate a thickness of small or 1/16 inch, medium or 5/32 inch, large or 3/16 inch or extra large or ¼ inch, corresponding to closure 10 having a distance "D" shown in FIG. 15 of 1/8 inch, 5/16 inch, 3/8 inch and ½ inch respectively. By using the gauge 116, the correct size of container closure can be selected for securing the upper and lower flaps of the container together.

In this drawing, the flap arm 106 of the catch 94 is shown engaging a portion of the bottom of the lower flap 22 and holding it against the bottom of the upper flap 14. Note the catch opening 108 is sufficient in size to receive the flap edge 54 therein.

In FIG. 10A, a front view of the container flap pull 88 as shown in FIG. 10 is illustrated. The pull 88 is of uniform thickness and may vary from approximately 0.01 inches to 0.18 inches and may be injection molded using various types of plastics or stamped from different types of metal alloys. In this view, the storage stop/thumb pull 102 can be seen extending outwardly from the side of the handle 92.

Figure 11:
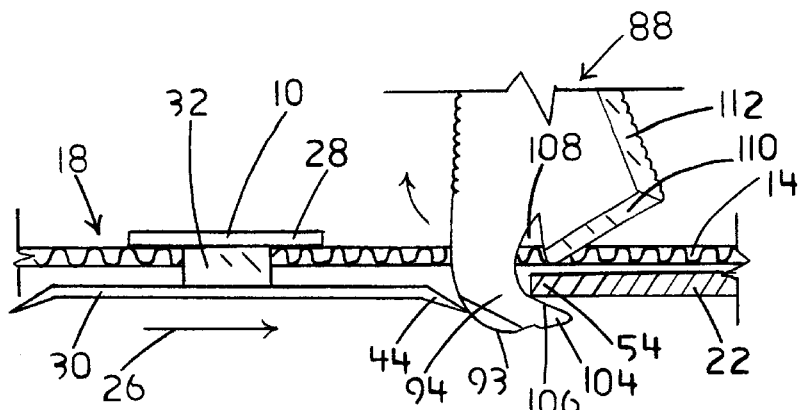
FIG. 11 is a side view of a lower portion of the container flap pull with a beveled lip of a lower member of a container closure moved from left to right and engaging a rounded end portion of the catch.

In FIG. 11, a side view of a beveled lip 44 of a lower member 30 of a container closure 10 is illustrated used in conjunction with the subject pull 88 for engaging and holding the lower flap 22 against the bottom of the upper flap 14. The container closure 10 also includes an upper member 28, which rides on top of the upper flaps 14 and 16, and a connector 32 used to connect the upper member 28 to the lower member 30. In this view, the connector 32 is received in a space between the upper flaps 14 and 16 and slid along the length of the flaps 14 and 16, as indicated by arrow 26, until the beveled lip 44 of the lower member 30 engages a portion of the rounded lower end 93 of the catch 94. The flap arm 106 is shown engaging the flap edge 54 of the lower flap 22.

Figure 12:
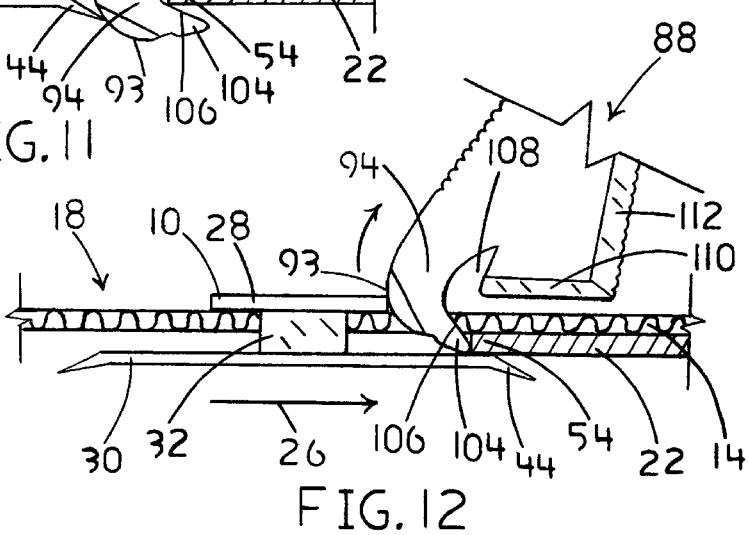
FIG. 12 is a side view of the lower portion of the container flap pull with the beveled lip of a lower member of a container closure moved from left to right squeezing the rounded end portion of the catch and rotating the catch upwardly in a clockwise manner. An end of the catch is shown released from the end of the flap edge of the lower flap.

In FIG. 12, the beveled lip 44 of the lower member 30 of the container closure 10 has continued to move from left to right, as indicated by arrow 26. The beveled lip 44 has squeezed the rounded end portion 93 of the catch 94 against the flap edge 54 thereby rotating the catch 94 upwardly in a clockwise manner. At this time, the flap arm 106 is shown released from the end of the flap edge 54 of the lower flap 22. At the same time, the beveled lip 44 has been received under the flap edge 54 of the lower flap 22.

Figure 13:
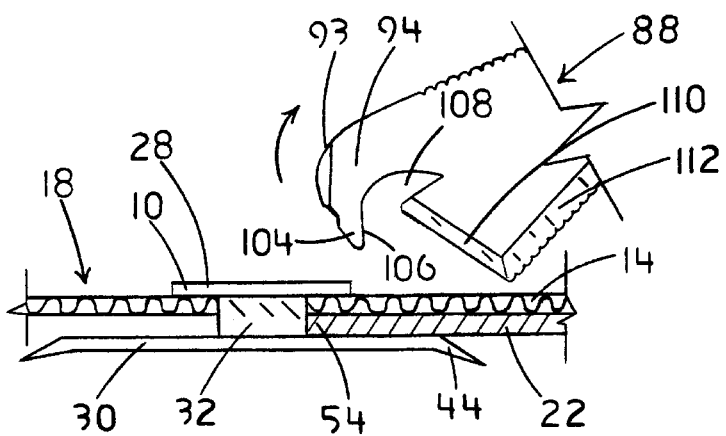
FIG. 13 is a side view of the lower portion of the container flap pull released from the lower flap. The lower flap and upper flap are shown compressed between the lower member of the container closure and an upper member of the container closure.

In FIG. 13, the catch 94 of flap pull 88 has been completely released from the lower flap 22. The lower flap 22 and the upper flap 14 are now shown compressed between the lower member 30 and the upper member 28 of the container closure 10 for securing the container flaps together in a locked and stored position.

In FIG. 14, a side view of the lower portion of the container flap pull 88 is shown having a center line A—A along the length of the pull 88. Also a line B—B is shown along the length of the flap arm 106 of the catch 94. Line B—B intersects the center line A—A at point "P". Point "P" is a pivot point when the catch 94 is used to engage and release the lower flap.

In this drawing, an angle 122 between the center line AA and line B—B is shown. This angle is in a range of 80 to 140 degrees. This angle is important because if the angle was less than the 80 degrees, the catch 94 is difficult to release from the flap edge 54. An angle greater than 140 degrees will provide a precarious grip on the lower flap 22. The chosen angle between 80 and 140 degrees provides an adequate firm grasp of the lower flap yet allows the lower flap to be released with ease when the catch 94 is removed as shown in FIGS. 11–13.

Note the catch 94 has a dimension "A" between an end point 124 at one end of the beveled stop 110 and the flap arm 106. Dimension "A" is in a range of ¼ to ½ inch for accommodating various thickness of flaps.

In FIG. 15, a side view of the lower portion of the container flap pull 88 is shown with the "V" shaped nose 104 of the catch 94 received inside a hole 42 in the upper member 28 of the container closure 10. The nose 104 is shown in an unlocked position in the hole 42. There are two holes in the upper member 28 and on opposite sides of the connector 32. The curb in the rounded lower end 93 prevents the nose 104 from dropping through the hole 42 as shown in FIG. 15A.

In FIG. 15A, the pull 88 has been raised upwardly and rotated in a counterclockwise manner. At this time, the bumper 109 of the catch 94 has engaged a side of the hole 42 and the "V" shaped nose 104 is now in a locked position. The pull 88 is now able to guide and push or pull the container closure 10 along the length of the space 12 between the upper flaps 14 and 16 of the container 18 for either securing or releasing the upper flaps 14 and 16 from the lower flaps 20 and 22.

In FIG. 16, a side view of the lower portion of the container flap pull 88 is shown with the "V" shaped nose 104 sliding downwardly, as indicated by arrow 128, on top of a lower flap 22 of the container 18 prior to the catch 94 engaging the lower flap 22.

In FIG. 16A, which is similar to FIG. 16, the "V" shaped nose 104 has dropped off of the top of a lower flap 22, as indicated by arrow 130, and the beveled stop 110 has engaged the top of the lower flap 22. In this manner, the stop 110 indicates that the catch 96 is in position to be moved from left to right, as shown in FIG. 10, for engaging the flap edge 54 of the lower flap 22. Note that the beveled stop 110 is on the same side of the centerline A—A along the length of the pull 88, shown in FIG. 14, as is the flap arm 106. The beveled stop 110 normally extends further outwardly from the centerline A—A, when measured perpendicularly, than does the flap arm 104 of the catch 94. The beveled stop 110 is normally located just above the flap arm 104 of the catch 94 in the direction of the handle end 92 of the pull 88. This feature of the pull 88 is important because when the upper flaps 14 and 16 are in a closed position on the container 18, the space between the upper flaps 14 and 16 is not sufficient to give the user of the pull 88 an adequate view of the position of the lower flap 22.

Figure 17:
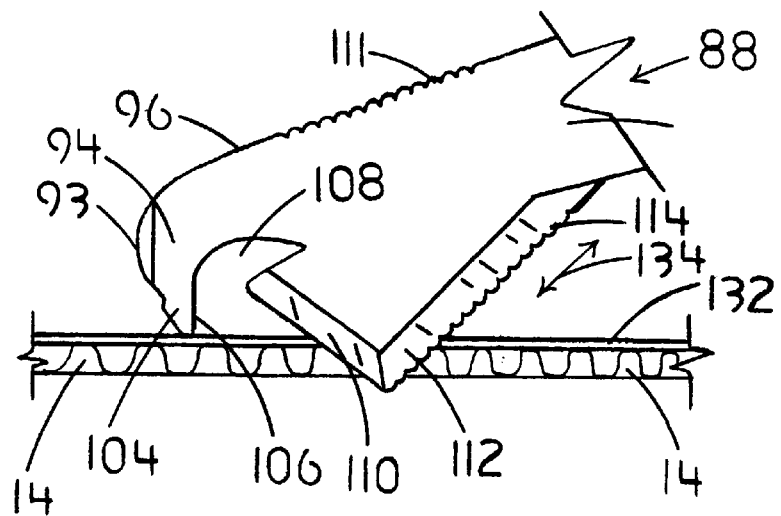
FIG. 17 is a side view of the lower portion of the container flap pull with a beveled spreader bar with cleats used for cutting tape used for securing the upper flaps of the container.

In FIG. 17, the beveled stop 110 and the beveled spreader bar 112 with cleats 114 are shown received in the space 12 between the upper flaps 14 and 16. The spreader bar 112 is beveled and separates the upper flaps 14 and 16, thereby applying tension onto tape 132. The cleats 114 are now used for cutting tape 132 used for securing the upper flaps 14 and 16 of the container 18. The cleats 114, by using a sawing action as indicated by arrow 134, provide a means for cutting through tape used for securing the container. The cleats 114 may be dull for safety and durability and eliminate the need of having to use a knife, a razor blade or the like. The cleats 114 normally have a thickness of about six thousandths of an inch or greater, which is sufficient to not inadvertantly cut the user. The notch saw 111 is shown in FIG. 17 on the edge 96 of the pull 88. The thickness of the notch saw 111, normally about the same as the thickness of the pull 88 shown in FIG. 10A, is within about ⅛ inch of the width of the slide connector 32 shown in FIG. 4.

Figure 18:
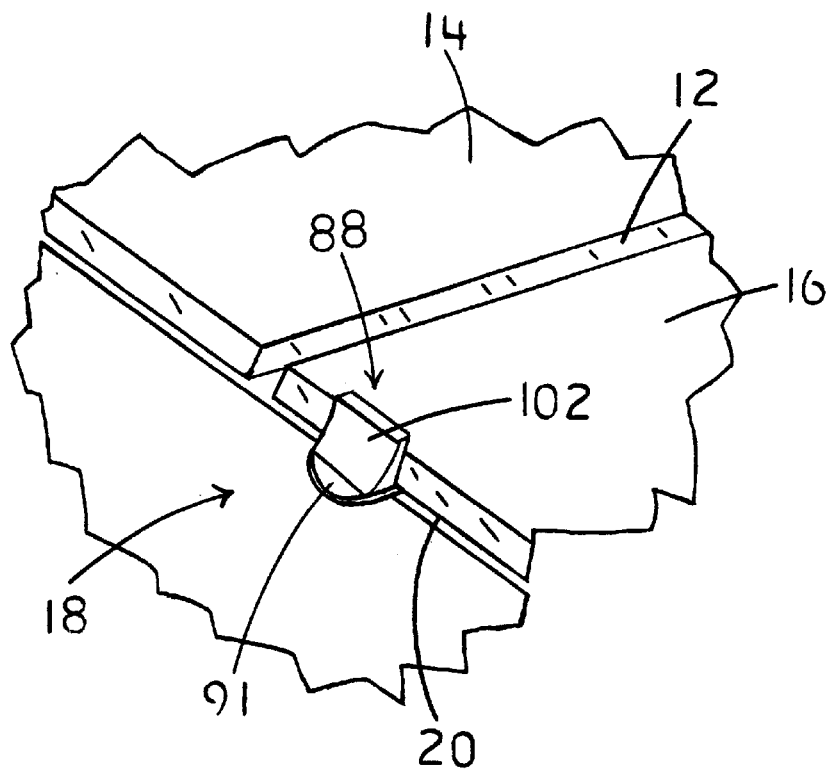
FIG. 18 is a perspective view of a portion of the container illustrating the space between the upper flaps and the flap pull in a stored position between one of the upper flaps and a lower flap with a storage stop/thumb grip resting against a side of the upper flap.

In FIG. 18. a perspective view of a portion of the container 18 is shown. In this drawing, the elongated space 12 is illustrated running between the upper flaps 14 and 16. The space 12 is used for receiving and guiding the connector of the container closure therebetween. Also in this drawing is the flap pull 88 shown in a stored position between one of the upper flaps 16 and a lower flap 20 with the storage stop/thumb grip 102 resting against a side of the upper flap 16. By gripping the storage stop/thumb grip 102 and pulling outwardly, the flap pull 88 can be quickly released from the container 18 for further use.

Figure 18A:
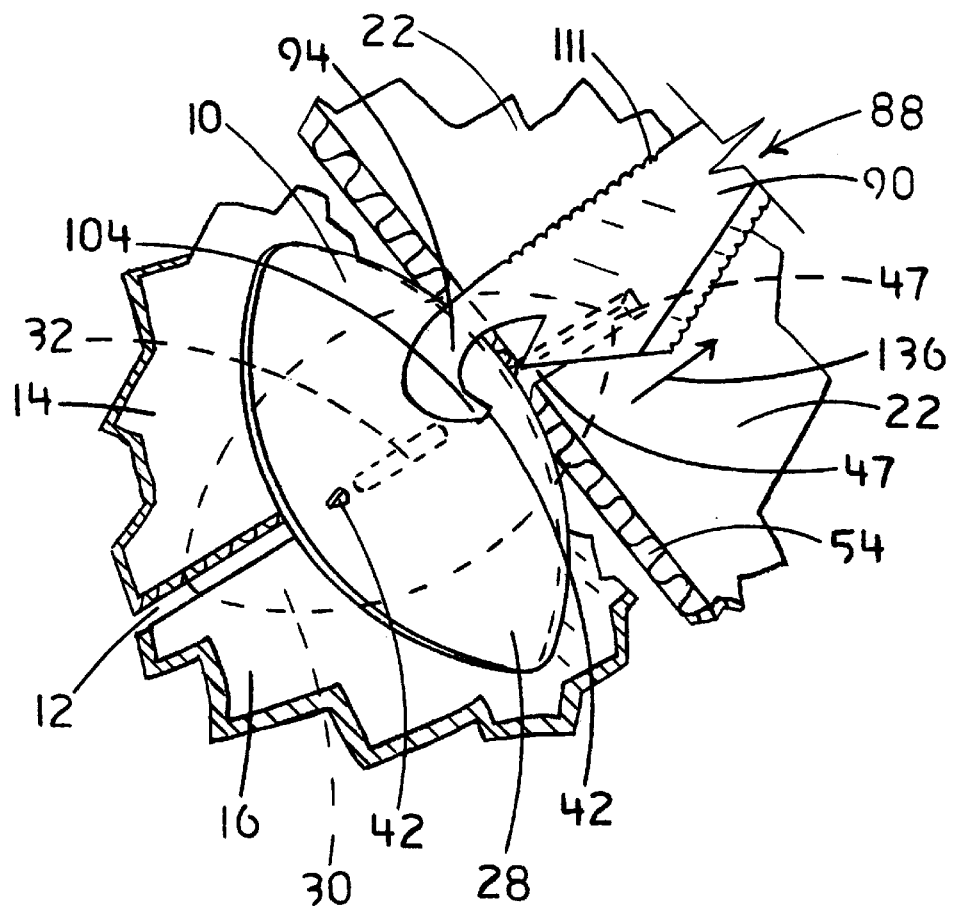
FIG. 18A is a perspective view of the container closure with the catch pulling the connector of the closure into a notch. The notch is cut into an edge of the lower flap for providing security when the container closure secures the lower flap to the upper flaps.

In FIG. 18A is a perspective view of the container closure 10 is shown with the "V" shaped nose 104 of the catch 94 pulling the closure 10 from left to right along the space 12 as indicated by arrow 136. Previously, the notch saw 111 of the pull 88 has been used to cut a notch 47 in the edge 54 of the lower flap 22. The notch 47 is used to receive the connector 32 of the closure 10 therein. When the connector 32 is received in the notch 47, the container closure 10 provides a more stationary fit when holding the lower flap 22 against the bottom of the upper flaps 14 and 16 and securing the flaps of container 18 for storage.

Figures 19, 19A:
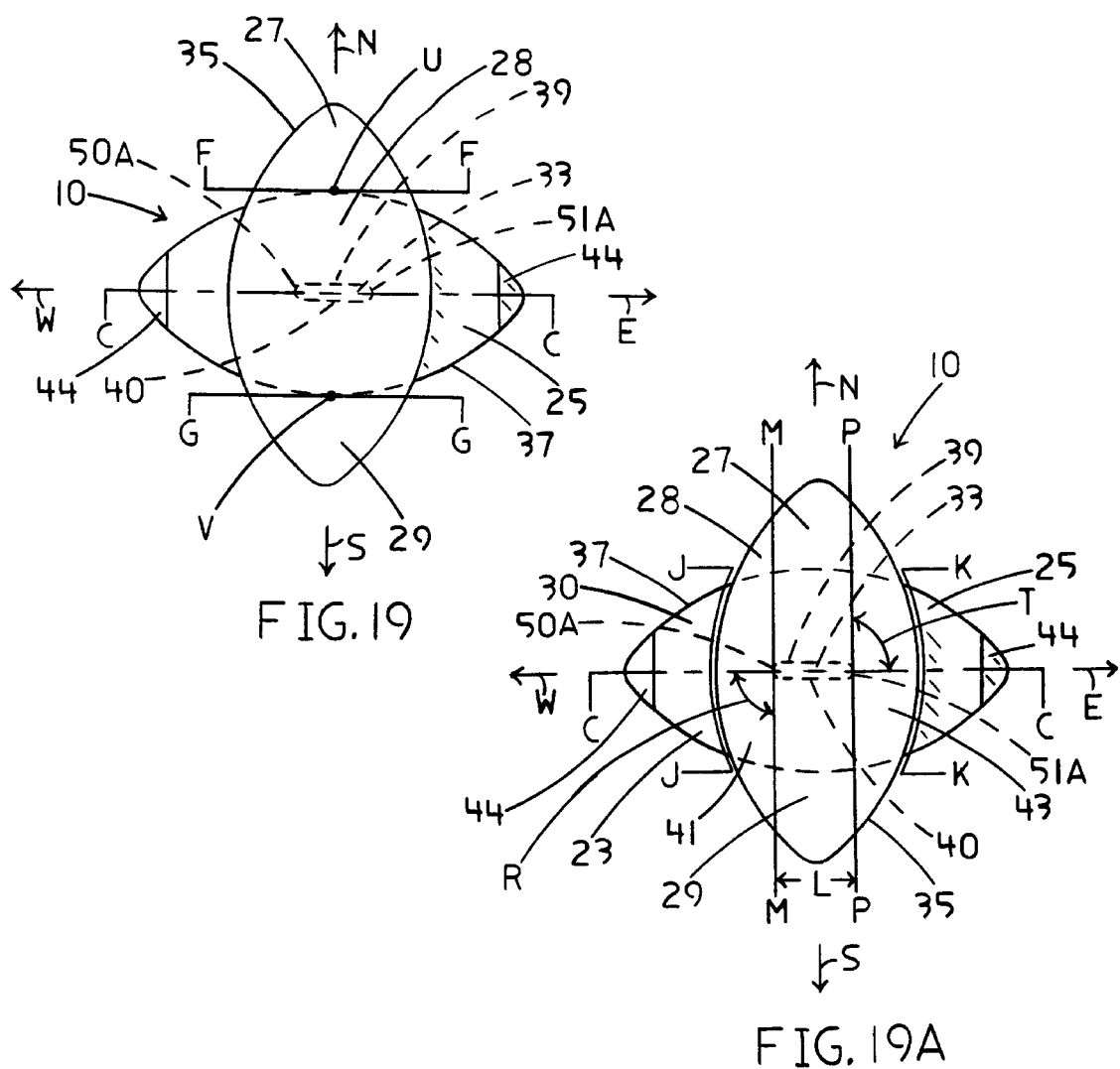
FIG. 19 is a top view of the closure, delineating structure.
FIG. 19A is a top view of the closure, similar to FIG. 19, delineating structure.

In FIG. 19 is a top view of the closure 10. The closure 10 is normally one piece and broadly includes a planar upper member 28 above a planar lower member 30. A webbed wall 33 is disposed between and connects the upper member 28 and the lower member 30 and is shown in dotted lines. The webbed wall 33 is similar to and encompasses the slide connector 32 shown in FIGS. 1 through 4. The webbed wall 33 has a length "L" sufficient to prevent the fastener 10 from turning when placed in the space 12 between the upper flaps 14 and 16 of the container 18. The length "L" is shown in FIG. 19A and the space 12 between the upper flaps 14 and 16 of the container 18 is shown in FIGS. 1, 2A, 4, 18, 21C and 29.

Figure 20:
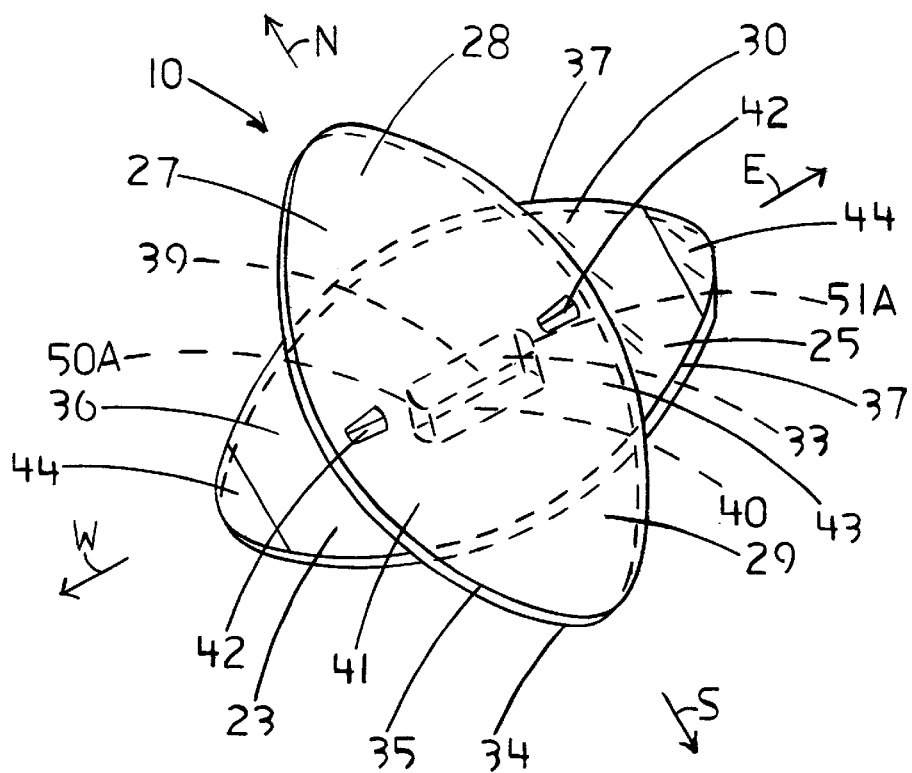
FIG. 20 is an enlarged perspective view of the closure.

Disposed at opposite ends of the webbed wall 33 are a first terminal edge 50A and a second terminal edge 51A. The terminal edges 50A and 51A are similar to and encompass the leading edges 50 and 51 of the sliding connector 32 shown in FIGS. 1, 2 and 2A. Terminal edges 50A and 51A are used to engage the first lower flap edge 52 of the first lower flap 20 and the second lower flap edge 54 of the second lower flap 22 of the container 18, shown in FIGS. 1, 2, 2A, 20A and 21C. Each terminal edge 50A or 51A normally extends from the bottom surface 34 of the upper member 28 to the top surface 38 of the lower member 30, as shown in FIG. 20.

A first side 39 and a second side 40 occur on opposite sides of the webbed wall 33. The first side 39 engages the first flap edge 15 of the first upper flap 14 and the second side 40 engages the second flap edge 17 of the second upper flap 16 when placed in the space 12 of the container 18, as shown in FIGS. 21, 21A, 21B and 21C.

A centerline C—C is shown in FIGS. 19 and 19A passing through the center of the webbed wall 33 along its length. The upper and lower members 28 and 30 of the closure 10 are shown, in FIGS. 19 and 19A, as being divided by an imaginary geometric plane of the centerline C—C, running lengthwise through the center of the webbed wall 33 and beyond. The plane of the centerline C—C is normally perpendicular to the plane of the upper member 28 or to the plane of the lower member 30 or, as is normally the case when the upper and lower members 28 and 30 are parallel, normally perpendicular to the plane of both the upper and lower members 28 and 30. Normally, approximately half of the upper member, lower member and webbed wall of the closure 10 occurs on each side of the plane of the centerline C—C. Also, when the closure 10 is placed between the upper flaps 14 and 16 of the container 18, the centerline C—C normally corresponds to a centerline, not shown, along the length of the space 12 between and running the length of the upper flaps 14 and 16.

The first side 39 of the webbed wall 33 is shown on one side of the plane of the centerline C-C and the second side 40 of the webbed wall 33 is shown on an opposite side of the plane of the centerline C—C. A point "U" is shown occurring on the perimeter 37 of the lower member 30 of the closure 10. Point "U" occurs on the same side of the plane of the centerline C—C as the first side 39 of the webbed wall 33. The point "U" is that point or points occurring on the perimeter 37 of the lower member 30 farthest from the plane of the centerline C—C, on the same side of the plane of the centerline C—C as first side 39 of the webbed wall 33, when measured perpendicularly from the plane of the centerline C—C.

A point "V" is shown occurring on the perimeter 37 of the lower member 30. The point "V" occurs on the same side of the plane of the centerline C—C as the second side 40 of the webbed wall 33. The point "V" is that point or points on the perimeter 37 of the lower member 30 farthest from the plane of the centerline C—C, on the same side of the plane of the centerline C—C as the second side 40 of the webbed wall 33, when measured perpendicularly from the plane of the centerline C—C.

A boundary line F—F is shown parallel to the plane of the centerline C—C and passing through point "U". A boundary line G—G is shown parallel to the centerline C—C and passing through point "V". Boundary lines F—F and G—G are also shown, in FIG. 19, as having imaginary geometric planes perpendicular to the plane of the lower member 30 and intersecting portions of the upper member 28 of the container closure 10. Arrows "N" and "S" are both perpendicular to the centerline C—C. A first guide 27 and a second guide 29 are shown, in FIG. 19, included in the upper member 28 of the closure 10. The first guide 27 is that portion of the upper member 28 on one side of the plane of the boundary line F—F in the direction of arrow "N". The second guide 29 is that portion of the upper member 28 on one side of the plane of the boundary line G—G in the direction of arrow "S". Put another way, the guides 27 and 29 are those portions of the upper member 28 of the closure 10 extending outwardly from the planes of the boundary lines F—F and G—G. The function of the guides 27 and 29 is discussed in detail under FIGS. 21, 21A and 21B. The subject closure 10 may be injection molded in one piece from plastic material.

In FIG. 19A is a top view of the closure 10 similar to FIG. 19. The upper member 28 is shown having the perimeter 35 along its boundary. The lower member 30 is shown having the perimeter 37 along its boundary.

The centerline C—C is shown, in FIG. 19A, passing through the webbed wall 33 along its length. A boundary line M—M is shown perpendicular to the centerline C—C, as indicated by an angle "R" of 90°, and passing through the first terminal edge 50A of the webbed wall 33 and through the upper member 28 of the closure 10. A boundary line P—P is shown, in FIG. 19A, perpendicular to the centerline C—C, as indicated by an angle "T" of 90°, and passing through the second terminal edge 51A of the webbed wall 33 and through the upper member 28 of the closure 10. Normally, the terminal edges 50A and 51A each extend from the upper member 28 to the lower member 30 of the closure 10. The planes of the boundary lines M—M and P—P are normally perpendicular to the plane of the upper member 28 and intersect a portion of the lower member 30.

A first overhang 41 is shown, in FIG. 19A, as that portion of the upper member 28 extending forward and outwardly from the first terminal edge 50A of the webbed wall 33. Put another way, the first overhang 41 is that portion of the upper member 28 occurring on one side of the boundary line M—M in the direction of the arrow "W". A second overhang 43 is shown as that portion of the upper member 28 extending forward and outwardly from the second terminal edge 51A. Put another way, the second overhang 43 is that portion of the upper member 28 occurring on one side of the boundary line P—P in the direction of the arrow "E". When in use, the first overhang 41 and the second overhang 43 of the upper member 28 extend over the first lower flap 20 or the second lower flap 22 of the container 18. In this way the first or second overhang works in conjunction with the lower member 30 and the first or second terminal edges to form a type of clamp holding the upper flaps and a lower flap of the container 18 tightly together, further illustrated in FIG. 20A.

A boundary line J—J is shown, in FIG. 19A, passing through a portion of the lower member 30 in front of the first terminal edge 50A and corresponding to a portion of the perimeter 35 of the upper member 28 of the closure 10. A boundary line K—K is shown passing through a portion of the lower member 30 in front of the second terminal edge 51A and corresponding to a portion of the perimeter 35 of the upper member 28 of the closure 10. The perimeter 35 of the upper member has an imaginary geometric plane normally perpendicular to the plane of the upper member 28, which may, as in FIG. 19A, intersect a portion of the lower member 30. An arrow "W" is shown perpendicular to the line M—M and an arrow "E" is shown perpendicular to the line P—P.

A first platform 23, shown in FIG. 19A, is that portion of the lower member 30 of the closure 10 extending outwardly from the plane of the perimeter 35 of the first overhang 41 of the upper member 28. Put another way, the first platform 23 is that portion of the lower member 30 occurring on one side of the boundary line J—J in the direction of the arrow "W". A second platform 25, shown in FIG. 19A is that portion of the lower member 30 of the closure 10 extending outwardly from the plane of the perimeter 35 of the second overhang 43 of the upper member 28. Put another way, the second platform 25 is that portion of the lower member 30 occurring on one side of the boundary line K—K in the direction of the arrow "E".

Put yet another way, the first platform 23 is that portion of the lower member 30 occurring to the front of the first terminal edge 50A of the webbed wall 33, in the direction of the arrow "W", which is outside the perimeter of the corresponding portion of the upper member 28. Similarly, the second platform 35 is that portion of the lower member 30 occurring to the front of the second terminal edge 51A of the webbed wall 33, in the direction of the arrow "E", which is outside the perimeter 35 of the corresponding portion of the upper member 28.

Put still another way, the first platform 23 is that portion of the lower member 30 occurring to the front of the first terminal edge 50A, in the direction of arrow "W", which has no portion of the upper member 28 opposite it. Similarly, the second platform 25 is that portion of the lower member 30 occurring to the front of the second terminal edge 51A, in the direction of arrow "E", which has no portion of the upper member 28 opposite it.

The first platform 23 and the second platform 25 are essential for providing structure to receive the first lower flap edge 52 or the second lower flap edge 54 upon their release from the catch 94 of the pull 88, as illustrated in FIGS. 11 through 13. The beveled lips 44 are shown included in the platforms 23 and 25 of the lower member 30 in FIG. 19A. Additional embodiments of the platforms are shown in FIGS. 24, 24A, 25, 26, 27 and 27A.

In FIG. 19A the arrows "W" and "E" correspond to the centerline C—C. The centerline C—C normally corresponds to the centerline of the space 12 between the upper flaps 14 and 16 and running the length of the upper flaps 14 and 16, shown in FIGS. 1, 2A, 18, 18A and 21C.

Also in FIG. 19A the webbed wall 33 is shown having a length "L". Normally, the length "L" is sufficient to prevent the closure 10 from turning or rotating when placed between the upper flaps 14 and 16. This allows the various features such as the first guide 27, the second guide 29, the first platform 23, the second platform 25, the first overhang 41, the second overhang 43, the first terminal edge 50A, the second terminal edge 51A, the holes 42 and the beveled lips 44 to be properly positioned in relation to the webbed wall in order to reliably fulfill their designated functions.

In FIG. 20 is an enlarged perspective view of the closure 10, similar to FIGS. 19 and 19A. The closure 10 is normally one piece and broadly includes the planar upper member 28, the planar lower member 30 and the webbed wall 33 disposed between and attached to a bottom surface 34 of the upper member 28 and a top surface 36 of the lower member 30. The webbed wall 33 is shown in this drawing in dotted lines.

The webbed wall 33 includes the first terminal edge 50A, the second terminal edge 51A, the first side 39 and the second side 40. The first side 39 of the webbed wall 33 is shown in FIG. 20 between the first terminal edge 50A and the second terminal edge 51A. Likewise, the second side 40 of the webbed wall 33 is shown between the first terminal edge 50A and the second terminal edge 50A. The first terminal edge 50A normally extends from the bottom surface 34 of the upper member 28 to the top surface 36 of the lower member 30. Likewise, the second terminal edge 51A normally extends from the bottom surface 34 of the upper member 28 to the top surface 36 of the lower member 30.

In FIG. 20, the upper member 28 of the closure 10 includes the first overhang 41, the second overhang 43, the first guide 27, the second guide 29, the perimeter 35 and the pull holes 42. The perimeter 37 of the lower member 30 of the closure 10 has an imaginary geometric plane, not shown, which follows the perimeter 37, is normally perpendicular to the plane of the lower member 30 and which may intersect portions of the upper member 28 of the closure 10. The first guide 27 of the upper member 28 is shown in FIG. 20 extending outwardly from the first side 39 of the webbed wall 33, past the plane of the perimeter 37 of the lower member 30. Similarly, the second guide 29 of the upper member 28 is shown extending outwardly from the second side 40 of the webbed wall 33, past the plane of the perimeter 37 of the lower member 30. The first overhang 41 of the upper member 28 is shown in FIG. 20 extending outwardly from the first terminal edge 50A. Similarly, the second overhang 43 of the upper member 28 is shown extending outwardly from the second terminal edge 51A of the webbed wall 33.

The pull holes 42 are shown in FIG. 20 as occurring in a portion of the upper member 28 coinciding with the centerline C—C, shown in FIGS. 19 and 19A. When a portion of the pull 88 is inserted into one of the pull holes 42, this particular placement of the pull holes 42 is important in directing the force exerted onto the closure 10 by the pull 88 in a manner consistent with urging the closure 10 back and forth in the space 12 between the upper flaps of the container 18 as efficiently as possible. Normally, the pull holes 42 occur in the upper member 28 of the closure 10 within ¼ inch from, including and or on either side of the centerline C—C.

In FIG. 20, the lower member 30 includes the first platform 23, the second platform 25, the beveled lips 44 and the perimeter 37. The first platform 23 is shown in FIG. 20 as the portion of the lower member 30 of the closure 10 occurring outside the plane of the perimeter 35 of the upper member 28 and to the front of the first terminal edge 50A of the webbed wall 33. Similarly, the second platform 25 is the portion of the lower member 30 of the closure 10 occurring outside the plane of the perimeter 35 of the upper member 28 and to the front of the second terminal edge 51A of the webbed wall 33.

The closure 10 shown in FIG. 20 is designed to slide either in one direction toward arrow "W" or in a second direction toward arrow "E" when placed in the space 12, shown in FIGS. 1, 2A, 18, 18A and 21C.

Figure 20A:
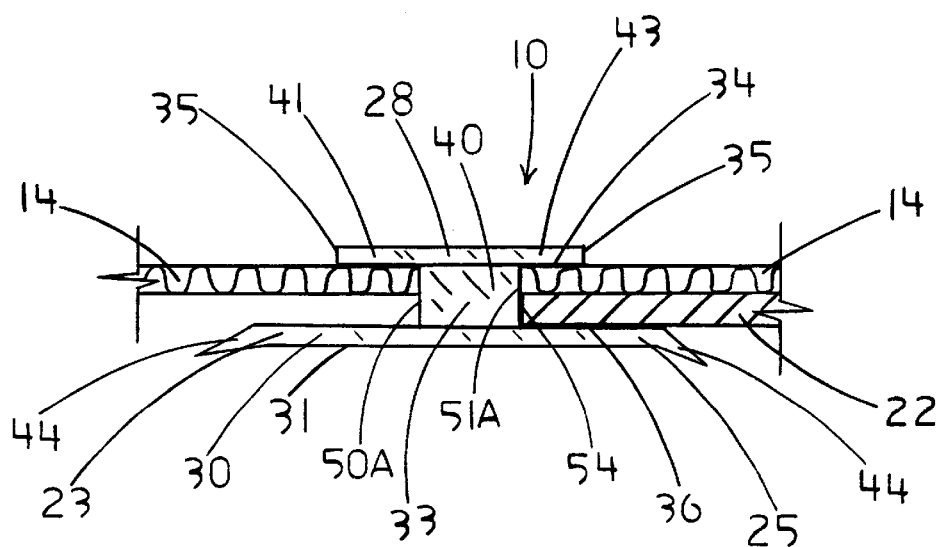
FIG. 20A is a side view of the closure and a sectional view of the container.

In FIG. 20A is a sectional view of a portion of the container 18 and a side view of the closure 10. In this view, the first upper flap 14 and the second lower flap 22 are shown received against each other in a secured position between the top surface 36 of the lower member 30 and the bottom surface 34 of the second overhang 43 of the upper member 28. The engagement of the second upper flap 16 by the closure 10 is not shown in this drawing. In this closed position, the second terminal edge 51A of the webbed wall 33 engages the flap edge 54 of the second lower flap 22. The second overhang 43 of the upper member 28 is, in this configuration, the portion of the upper member extending over the lower flap 22.

Likewise, were the first terminal edge 50A of the webbed wall 33 to engage the flap edge 52 of the first lower flap 20, the first overhang 41 of the upper member 28 would extend over the first lower flap 20. The first lower flap 20 and the flap edge 52 are shown in FIG. 1. The flap edge 52 of the first lower flap 20 along with the flap edge 54 of the second lower flap 22 is shown in FIG. 1.

The first platform 23 of the lower member 30 is shown, in FIG. 20A, as outside the plane of the perimeter 35 of the corresponding portion of the upper member 28 and in front of the terminal edge 50A of the webbed wall 33. The second platform 25 of the lower member 30 is shown as outside the plane of the perimeter 35 of the corresponding portion of the upper member 28 of the closure 10 and in front of the terminal edge 51A of the webbed wall 33.

The platforms 23 and 25 provide an area sufficient to receive the catch 94 portion of the pull 88 and sufficient to engage either lower flap 20 or 22 upon its release from the catch 94. Normally this area extends about ¼ inch or further beyond the plane of the perimeter of the corresponding upper member.

The beveled lips 44 are shown included in the platforms 23 and 25 of the lower member 30 in FIG. 20A. The beveled lips 44 normally extend below the plane of a bottom surface 31 of the lower member 30. In this way the beveled lips 44 may engage the flap edge 52 or 54 of the lower flap 20 or 22 which is below the bottom surface 31 of the lower member 30 of the closure 10.

Figure 21:
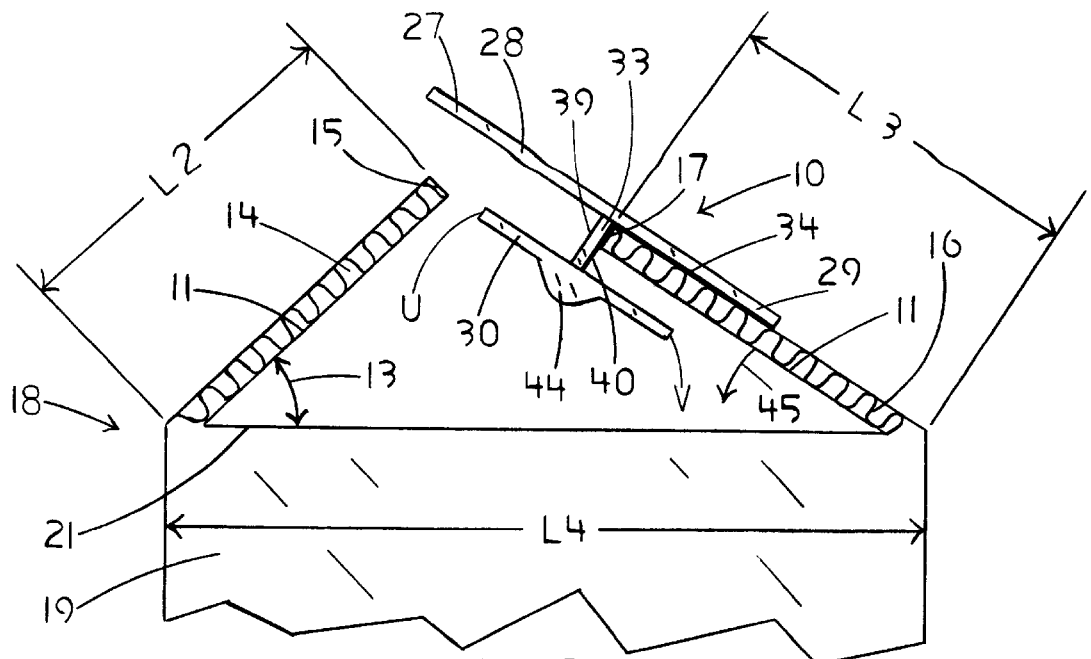
FIG. 21 is an end view of the container and the closure.
Figure 21A:
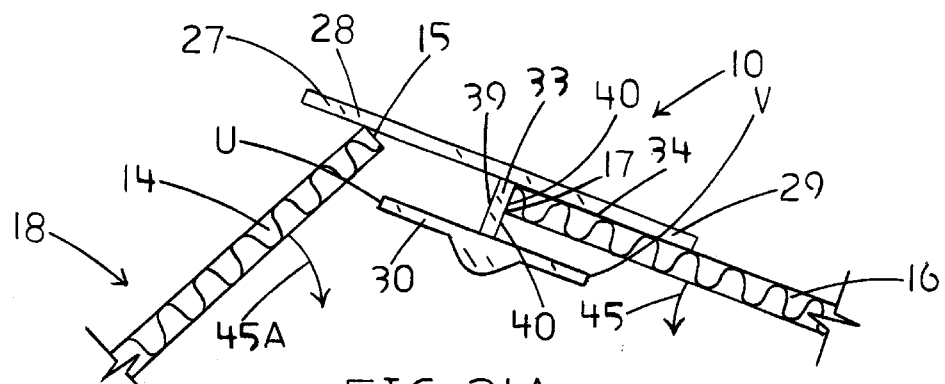
FIG. 21A is an end view of the closure and a portion of the container, similar to FIG. 21.
Figure 21B:
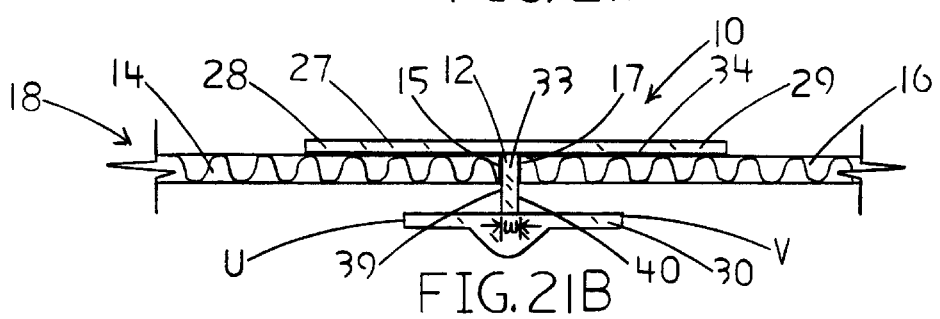
FIG. 21B is an end view of the closure and a portion of the container.

FIGS. 21, 21A and 21B are sequential and illustrate the closure 10 being applied to the open upper flaps 14 and 16 of the container 18, prior to engaging a lower flap 20 or 22.

In FIG. 21 is an end view of the closure 10 and an end view of the container 18, showing the upper flaps 14 and 16 in an "open" position. The closure 10 is positioned on the second upper flap 16 with the bottom surface 34 of the upper member 28 flush against the top of the second upper flap 16. The second side 40 of the webbed wall 33 is shown flush against the flap edge 17 of the second upper flap 16. The first and second guides 27 and 29 of the upper member 28 are shown, in FIG. 21, extending outwardly past the points "U" and "V" of the lower member 30 of the closure 10.

The second upper flap 16 along with the closure 10 is shown, in FIG. 21, moving downwardly, as indicated by arrow 45, while the first upper flap 14 remains stationary. The lower member 30 of the closure 10 is shown bypassing the flap edge 15 of the first upper flap 14. The first guide 27 of the upper member 28 is shown in a position to engage the flap edge 15 of the upper flap 14 upon further lowering of the second upper flap 16 along with the closure 10.

The first upper flap 14 is shown in FIG. 21 as having, in this particular example, a length L2 of four and one-half inches. Likewise, the second upper flap 16 has a length L3 of four and one-half inches. An end wall 19 of the container 18 is shown, in this example, having a length L4 of nine inches. An angle 13 is shown between a bottom surface 11 of the first upper flap 14 and a top edge 21 of an end wall 19 of the container 18. In this configuration, the closure 10 may be adapted so that the lower member 30 by-passes the flap edge 15 of the first upper flap 14 and the first guide 27 of the upper member 28 engages the flap edge 15 of the first upper flap 14, as shown in FIG. 21A, with the angle 13 being in a range of about ten degrees to about 85 degrees. Obviously, were the closure 10 placed on the first upper flap 14 and lowered, the second guide 29 would likewise engage the flap edge 17 of the second upper flap 16 with the angle, not shown, between the bottom surface 11 of the second upper flap 16 and the top edge 21 of the end wall 19 of the container 18 ranging from about 10 degrees to about 85 degrees.

In order for the lower member 30 of the closure 10 to bypass an upper flap having an angle 13 of about ten degrees, the lower member 30 would necessarily be considerably more narrow than the lower member 30 shown in FIG. 21. In order for the upper member 28 to engage an upper flap having an angle 13 of about 85 degrees, the upper member 28 would necessarily be considerably wider than the upper member 28 shown in FIG. 21.

FIG. 21A is an end view of the closure 10 and an end view of the container 18, showing only portions of the upper flaps 14 and 16, which are in an "open" position. FIG. 21A is similar to FIG. 21 and shows the closure 10 along with the second upper flap 16 having moved downwardly as indicated by arrow 45. The first guide 27 of the upper member 28 is shown engaging the heretofore stationary flap edge 15 of the first upper flap 14. As the second upper flap 16, along with the closure 10, is moved downwardly, as indicated by arrow 45, the flap edge 15 of the first upper flap 14 is likewise urged downwardly, as indicated by arrow 45A, and drawn into a position between the upper member 28 and the lower member 30 of the closure 10, also shown in FIG. 21C.

Also, in this manner the upper flaps 14 and 16 are forced apart upon further lowering of the closure 10, thus creating the space 12 between the upper flaps, shown in FIGS. 1, 2A, 18, 18A and 21C. The width of the space 12, shown in FIG. 21B, is about equal to the width "W" of the webbed wall 33. This is important in allowing the webbed wall 33, along with the closure 10, to move back and forth in the space 12 unimpeded by the flap edges 15 and 17 and without damaging the flap edges 15 and 17. Note once again the importance of the webbed wall 33 in consistently positioning the closure 10 on the container 18. In this way the closure 10 may be invariably applied to the container 18 with little effort.

In FIG. 21B is an end view of the fastener 10 and an end view of the container 18, showing portions of the upper flaps 14 and 16, which are in a "closed" position. The upper member 28 of the closure 10 is shown resting atop the upper flaps 14 and 16, with the lower member 30 below the upper flaps 14 and 16. The first side 39 of the webbed wall 33 is against the flap edge 15 of the first upper flap 14. The second side 40 of the webbed wall 33 is against the flap edge 17 of the second upper flap 16. The upper flaps 14 and 16 are shown in FIG. 21B as being forced apart by the webbed wall 33, thus creating the space 12 between the upper flaps 14 and 16.

Figure 21C:
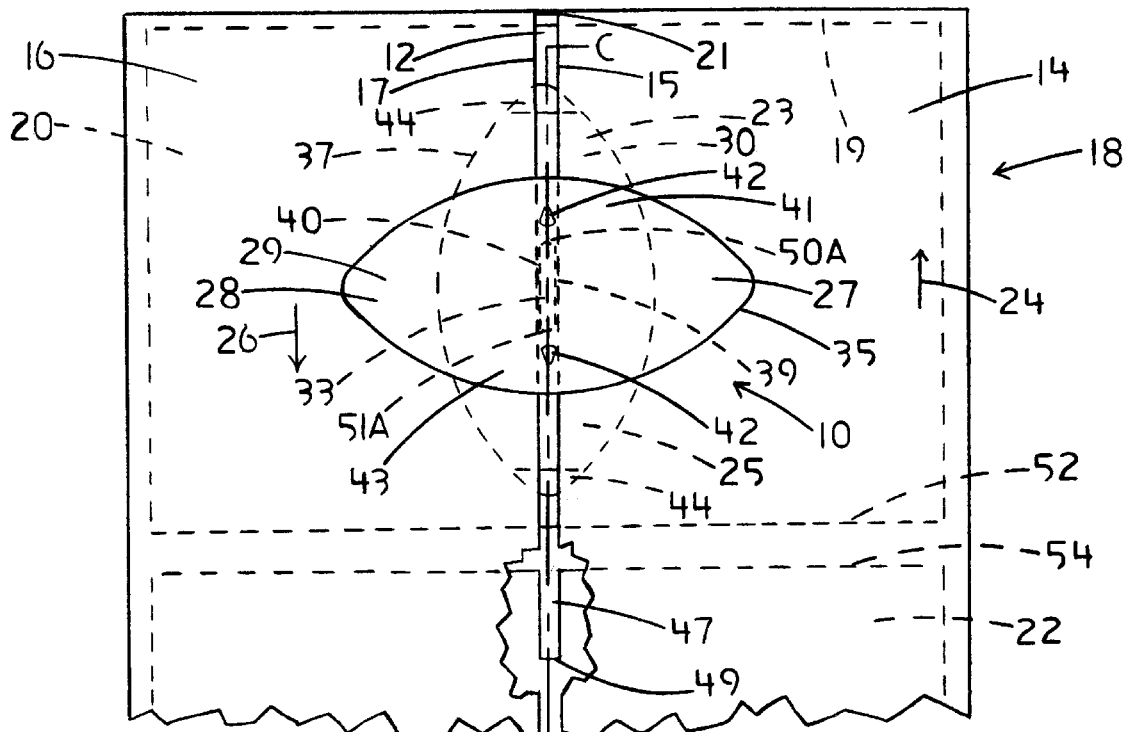
FIG. 21C is a top view of the container and the closure.

In FIG. 21C is a top view of the closure 10 and the container 18. The upper member 28 is shown atop the upper flaps 14 and 16. The lower member 30 of the closure 10 is below the upper flaps 14 and 16 and above the first lower flap 20. The webbed wall 33 of the closure 10 is in the space 12 between and running the length of the flap edges 15 and 17 of the upper flaps 14 and 16.

In FIG. 21C, a portion of the upper flaps 14 and 16 is shown cut away to reveal a portion of the lower flap 22 having the notch 47 with a notch edge 49 at one end, an opposite end of the notch 47 being open. The notch 47 is also shown in FIG. 18A. When in use, the closure 10 is moved in the direction of arrow 26 until the webbed wall 33 is received into the notch 47, with the second terminal edge 51A of the webbed wall 33 engaging the notch edge 49 of the notch 47. A notch 47 may likewise be included in the first lower flap 20 and is not shown. A more secure engagement of the upper flaps 14 and 16 with a lower flap 20 or 22 is accomplished by the closure 10 when inserting the closure 10 into the notch 47. Notice that normally the notch 47 corresponds to a portion of the space 12 between the upper flaps 14 and 16. The notch 47 is normally cut through the flap edge 15 or 17 and into the lower flap 20 or 22 perpendicularly to the flap edges 52 or 52, directly below the space 12, to a depth corresponding to approximately the length of the webbed wall 33, which is normally about two inches or less. Also, the flap edges 15 and 17 occur along the free ends of the lower flaps 20 and 22. The first and second lower flaps 20 and 22 are attached at the end opposite the free ends to the end walls 19 of the container 18. only the first lower flap 20 of the container 18 is shown attached to the end wall 19 in FIG. 21C. The notch 47 may be die cut into a lower flap or cut into the lower flap using the notch saw 111 of the pull 88, shown in FIG. 10.

The centerline C—C is shown in FIG. 21C through the length of the webbed wall 33 and beyond. The centerline C—C Corresponds approximately to a centerline along the length of the space 12. The pull holes 42 are shown, in FIG. 21C, disposed above the space 12 between and running the length of the upper flaps 14 and 16.

Also in FIG. 21C, the plane of the centerline C—C is shown intersecting a portion of the platforms 23 and 25, which is normal in this embodiment of the closure 10. Since the pull 88 normally works within the space 12 between the upper flap 14 and 16, for the platforms to engage the pull 88, they normally also occur in an area corresponding to the space 12, which likewise normally corresponds to the plane of the centerline C—C. This is not always the case, however, as is shown by the closure 10 described in FIGS. 25 and 27.

Figure 22:
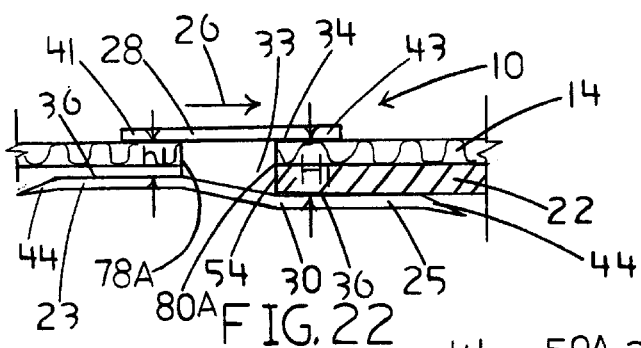
FIG. 22 is a side view of the closure and a sectional view of a portion of the container.

In FIG. 22 is a side view of the closure 10 and a sectional view of the container 18, similar to FIG. 7. The closure 10 is shown having a distance "h1" between the bottom surface 34 of the upper member 28 and the top surface 36 of the lower member 30 in front of a first terminal edge 78A as being less than a distance "H1" between the bottom surface 34 of the upper member 28 and the top surface 36 of the lower member. 30 in front of a second terminal edge 80A. The closure 10 has been moved along the space 12 in the direction of arrow 26 and is shown compressing the first upper flap 14 and the second lower flap 22 together, between the upper and lower members.

The lesser distance "h1", shown in FIG. 22, in front of the first terminal edge 78A of the webbed wall 33 is for accommodating upper flaps and lower flaps of lesser thickness than the upper flaps 14 and 16 and the lower flaps 20 and 22 of the container 18, shown in FIG. 1. By moving the closure 10 in a direction opposite of arrow 26, the flaps of lesser thickness may be accomodated between the upper member 28 and the lower member 30 of the closure 10. In this way a reversible, two-closures-in-one closure 10 is created.

Figure 23:
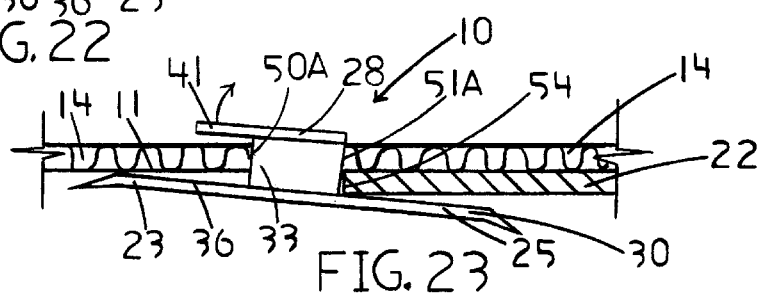
FIG. 23 is a side view of the closure and a sectional view of a portion of the container.

In FIG. 23 is a side view of the closure 10 and a sectional view of the container 18 showing portions of the upper flap 14 and the lower flap 22. The second platform 25 of the lower member 30 is shown engaging the second lower flap 22 without the aid of a second overhang 43. As a result, the closure 10 tilts, thus lifting the first overhang 41 above the upper flap 14 into a position where it is vulnerable to being snagged by foreign objects. Likewise, the second lower platform 25 is shown tilted below the second lower flap 22, where it is vulnerable to being snagged by the contents of the container 18. Also, the upper flaps 14 and 16 are not held quite as tightly against the lower flap 20 or 22 when the closure 10 tilts as when closure 10 does not tilt. Notice that the top surface 36 of the lower member 30 has engaged the bottom surface 11 of the first upper flap 14, thus halting any further tilting by the closure 10.

Figure 24:
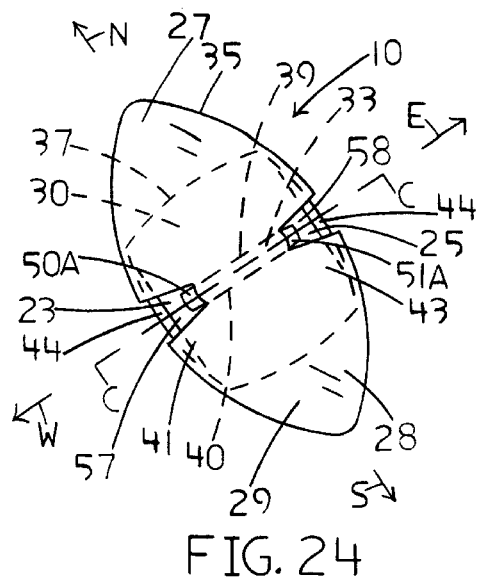
FIGS. 24–27 show other preferred embodiments of the closure and flap pull.

In FIG. 24, the closure 10 is shown as having a portion of the first overhang 41 of the upper member 28, including the centerline C—C, cut away to form a first upper pull opening 57. A portion of the second overhang 43 of the upper member 28, including the centerline C—C, is shown cut away to form a second upper pull opening 58. The first pull opening 57 normally occurs in the first overhang 41 of the upper member 28 of the closure 10, in front of the first terminal edge 50A of the webbed wall 33 in the direction of arrow "W". The second pull opening 58 normally occurs in the second overhang 43 of the upper member 28, in front of the second terminal edge 51A in the direction of arrow "E". The first upper pull opening 57 and the second upper pull opening 58 of the upper member 28 are useful for receiving a portion of the flap pull 88, thus allowing the pull 88 to by-pass a portion of the overhangs 41 and 43 of the upper member 28 of the closure 10, shown in FIGS. 26–27A.

Figure 25:
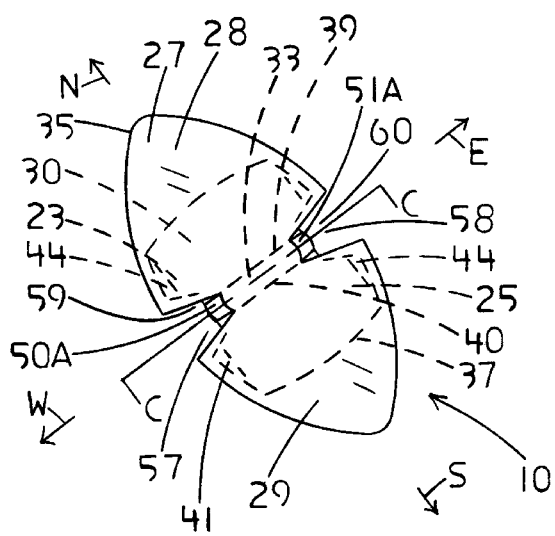

Note that in cases where the first upper pull opening 57 occurs in the first overhang 41 of the upper member 28 of the closure 10, shown in FIGS. 24–25, the first platform 23 of the lower member 30 may include a portion of the lower member 30 that is within the perimeter 35 of the corresponding portion of the upper member 28. In other words, in cases where the closure 10 includes a first upper pull opening 57, a portion of the first platform 23 of the lower member 30 may be included within the plane of the perimeter 35 of the upper member 28 of the closure 10, thus may a portion of the upper member 28 occur opposite first platform 23. The plane of the perimeter 35 is defined under FIG. 19A.

Likewise, in cases where the second upper pull opening 58 occurs in the second overhang 43 of the upper member 28 of the closure 10, the second platform 25 of the lower member 30 may include a portion of the lower member 30 that is within the perimeter 35 of the corresponding portion of the upper member 28. In other words, in cases where the closure 10 includes a second upper pull opening 58, shown in FIGS. 24–25, a portion of the second platform 25 of the lower member 30 may be included within the plane of the perimeter 35 of the upper member 28, thus may a portion of the upper member 28 occur opposite second platform 25. The plane of the perimeter 35 is defined under FIG. 19A.

When in use, the pull 88 engaging the first lower flap 20 of the container 18 by-passes a portion of the first overhang 41 and is received into the first upper pull opening 57. The lower flap 20 is then released by the pull 88 onto the first platform 23, somewhat similar to the sequence shown in FIGS. 11–13, but more clearly shown in FIGS. 26–27A.

Likewise, when in use, the pull 88 engaging the second lower flap 22 of the container 18 by-passes a portion of the second overhang 43 and is received into the second upper pull opening 58. The lower flap 22 is then released by the pull 88 upon the second platform 25, somewhat similar to the sequence shown in FIGS. 11–13, but more clearly shown in FIGS. 26–27A.

In FIG. 24, the terminal edges 50A and 51A of the webbed wall 33 are shown inclined in relation to the lower member 30 of the closure 10. The inclined terminal edges aid in removal of the flap pull 88 by offering, when striking a portion of the flap pull, a path of least resistance to the flap pull of up the incline and away from the closure 10, more clearly shown in FIGS. 26–27A.

Figure 24A:
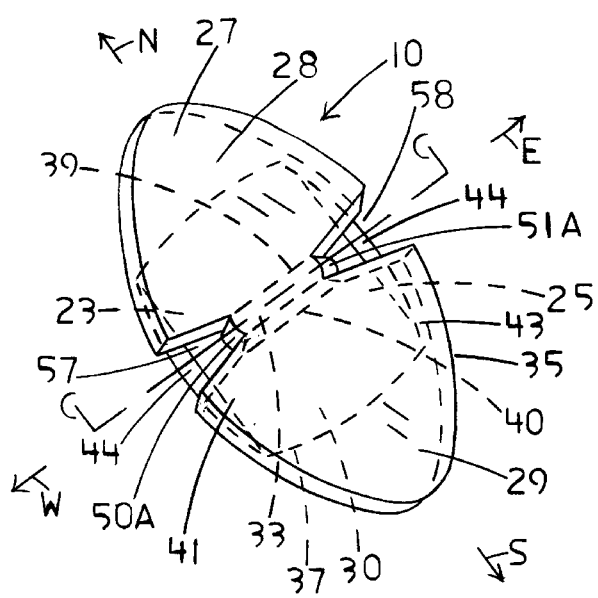
FIG. 24A is a perspective view of the closure.

FIG. 24A is an enlarged perspective view of the closure 10 similar to FIG. 24. The first pull opening 57 is shown including the centerline C—C and occurring to the front of the terminal edge 50A of the webbed wall 33. The second pull opening 58 is shown including the centerline C—C and occurring to the front of the second terminal edge 51A.

FIG. 25 is a top view of the closure 10 similar to FIGS. 24 and 24A, but with portions of the lower member 30 cut away to form a first lower pull opening 59 and a second lower pull opening 60. The first lower pull opening 59 is shown to the front of the first terminal edge 50A of the webbed wall 33 and including the centerline C—C. The second lower pull opening 60 is shown, in FIG. 25, to the front of the second terminal edge 51A of the webbed wall 33 and including the centerline C—C.

The first platform 23 of the lower member 30 is shown, in FIG. 25, wholly within the plane of the perimeter 35 of the upper member 28. Likewise, the second platform 25 of the lower member 30 is shown, in FIG. 25, wholly within the plane of the perimeter 35 of the upper member 28 of the closure 10.

Figure 27:
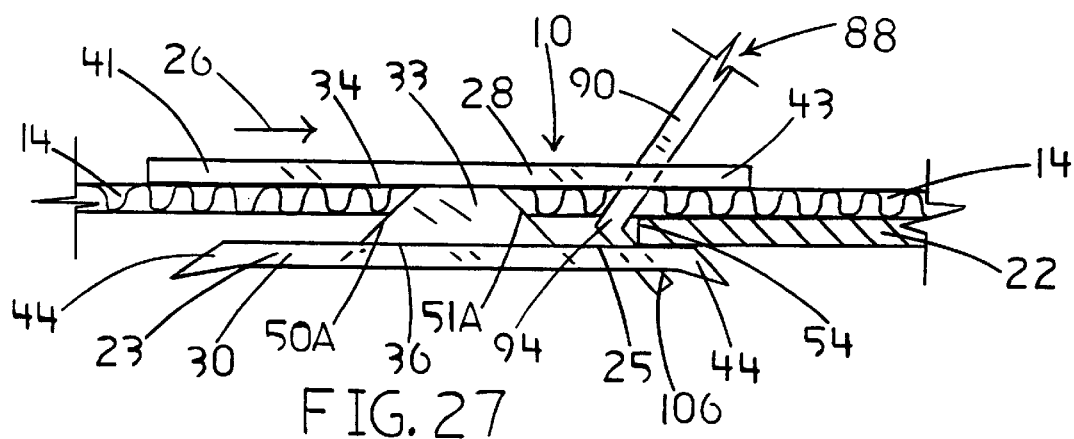
Figure 27A:
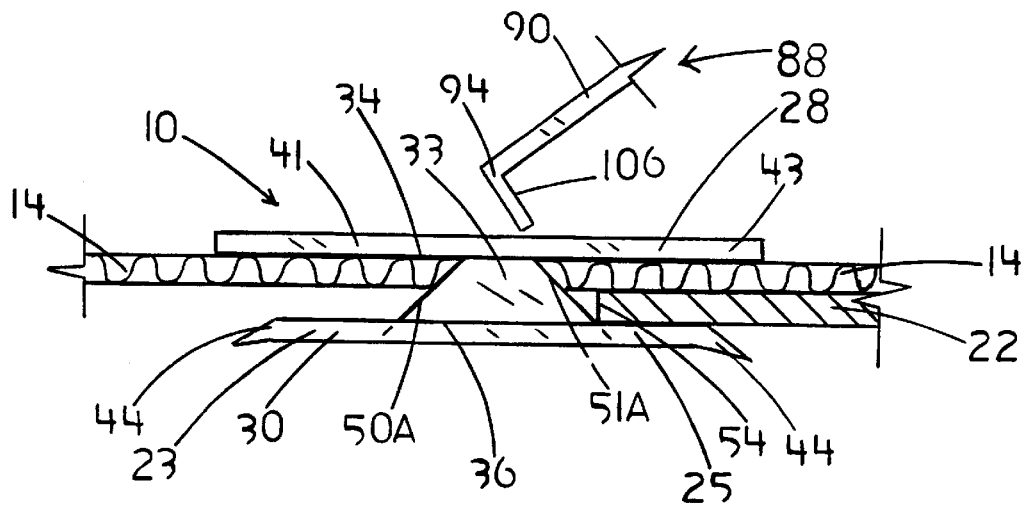

Referring now to FIGS. 27 and 27A, when in use, the closure 10 is moved in the direction of arrow 26. The catch 94 of the pull 88 engaging the second lower flap 22 of the container 18 is received into the second lower pull opening 60, shown in FIG. 25, of the lower member 30, whereupon the lower flap is released by the catch 94 of the pull 88 upon the second platform 25 of the lower member 30.

Likewise, to engage the first lower flap, not shown, the closure 10 is moved in the opposite direction of arrow 26. The catch 94 of the pull 88 engaging the first lower flap 20 is received into the first lower pull opening 59, whereupon the lower flap is released by the catch 94 of the pull 88 upon the first platform 23 of the lower member 30. The first lower flap of the container 18 is shown in FIGS. 1, 2, 3 and 4.

When applying the closure 10, the lower pull openings 59 and 60, shown in FIG. 25, upon receiving the catch 94 of the pull 88 eliminate pressure, especially during removal of the catch 94, of the lower member 28 against the catch 94 of the pull 88, shown in FIGS. 27 and 27A. This allows the flap arm 106 of the catch 94 of the pull 88 to be longer and therefore able to more securely grip the lower flaps 20 and 22 of the container 18.

Without the lower pull openings 59 and 60, the catch 94 of the pull 88 is bound, when in use, between the upper surface 36 of the lower member 30 and a flap edge 15 or 17. This bound condition may be remedied by including a "V" shaped nose 104 in the catch 94 of the pull 88, shown under FIGS. 11–13, or by having the length of the flap arm 106 of the catch 94 of the pull 88 necessarily shortened.

Also, normally upon entering either lower pull opening 59 or 60, the catch 94 of the pull 88 by-passes the lower member 30 and does not strike any portion of the closure 10 until a portion of one of the platforms 23 or 25 is securely underneath the lower flap. This eliminates the possibility of the beveled lip 44 striking the catch 94 of the pull 88 and prematurely jarring the lower flap of the container 18 loose from the catch 94.

Obviously, in the case of the closure 10 shown in FIG. 25, for the lower pull openings 59 and 60 to work at all, corresponding upper pull openings 57 and 58 should occur in the overhangs 41 and 43 of the upper member 28 of the closure 10. Otherwise, the pull 88 could not be received into the lower pull openings unless the overhangs were eliminated or the platforms extended to sufficiently beyond the perimeter of the upper member.

The upper pull openings 57 and 58 of the overhangs 41 and 43 of the upper member 28, shown in FIGS. 24–25, allow the pull 88, when in use, to by-pass portions of the first and second overhangs 41 and 43. As a result, substantial portions of the platforms 23 and 25 of the lower member 30 of the closure 10 may be included within the plane of the perimeter 35 of the upper member 28. This allows the closure 10 including the upper flap openings 57 and 58 to be more compact, thus less expensive to manufacture and to package for sale than, for example, the closure 10 shown in FIGS. 19–20A, which, although a bit more bulky, does offer the advantage of greater stability due to a greater surface area in the lower member 30 and a further advantage of pull holes 42 in the upper member 28 in place of the upper pull openings. The pull openings 57–60 also allow the closures 10 to be nested together, terminal edge to terminal edge, when not in use or especially when packaged for sale, thus using valuable shelf space more efficiently.

Figure 25A:
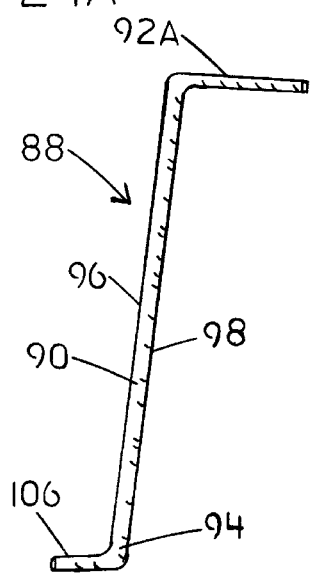
FIG. 25A is a perspective view of the flap pull.

FIG. 25A shows another embodiment of the pull 88, having a crooked handle 92A at one end of the elongated arm 90 and the catch 94 at the opposite end. The elongated arm 90 has the first edge 96 on one side and the second edge 98 along the opposite side. The catch 94 includes the flap arm 106. The flap pull 88 shown in FIG. 25A is similar to the pull 88 shown in FIG. 10, except many of the features are excluded. The pull 88 is shown in operation in FIGS. 26–27.

Figure 26:
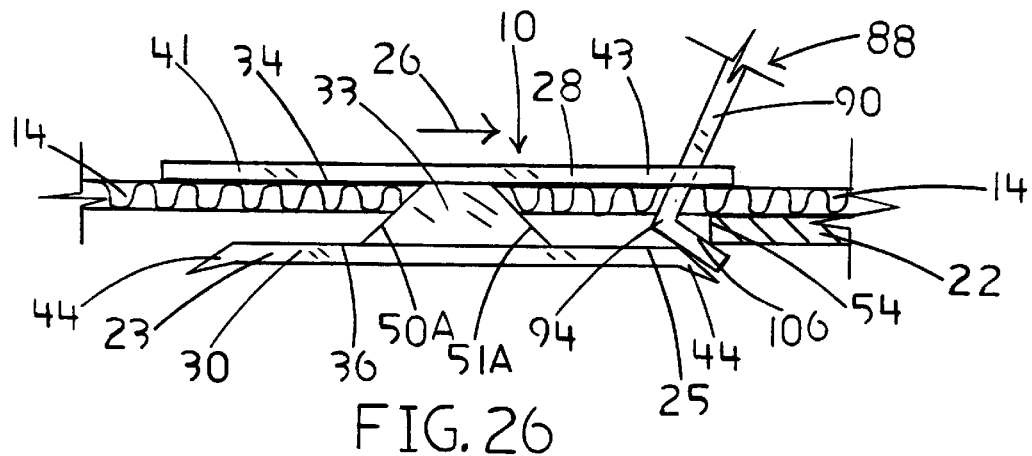

FIG. 26 is a side view of the closure 10 and a sectional view of the container 18. The flap arm 106 of the catch 94 of the pull 88 has engaged and lifted the second lower flap 22 against the upper flaps 14 and 16. Flap 16 is not shown. This figure illustrates a portion of the pull 88 being by-passed by a portion of the second overhang 43 of the upper member 28 of the closure 10. The closure 10 is shown moving in the space 12 between the upper flaps in the direction of arrow 26.

In FIG. 27 is a side view of the closure 10 and a sectional view of the container 18, showing a portion of the pull 88 being by-passed by a portion of the second overhang 43 and by a portion of the second platform 25. The closure 10 is shown moving in the space 12 between the upper flaps in the direction of arrow 26.

FIG. 27A is a side view of the closure 10 and a sectional view of the container 18, similar to FIG. 27. The catch 94 of the pull 88 is shown having engaged the second terminal edge 51A, traveled up the terminal edge 51A and away from the closure 10. The flaps 14 and 22 are shown in a fastened position between the second overhang 43 of the upper member 28 and the second platform 25 of the lower member 30.

The upper and lower members of the subject closure may be adapted in various ways for the purpose of adjusting strength and flexibility. For example, the thicknesses of the members may be greater near the webbed wall than at the perimeter, the members may be corrugated, the upper member may be downwardly curved, in which case a rebounding material such as spring steel could be used in manufacture to create a constant tension against the flaps, etc.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A one-piece closure for containers having first and second upper entry-exit flaps and having at least one lower entry-exit flap, the upper flaps having parallel flap edges, the closure comprising:

an upper member for receipt on top of a portion of the first and second upper flaps;

a lower member for receipt on bottom of a portion of the lower flap;

a webbed wall attached to said upper and lower members and disposed therebetween, said webbed wall dimensioned to fit between the parallel flap edges of the upper flaps when the upper flaps are in a closed position, said webbed wall having a first terminal edge for engaging a flap edge of the first lower flap when the lower flap is in a closed position;

said webbed wall having a length sufficient to prevent said webbed wall from turning when positioned between the closed upper flaps.

said lower member including a platform disposed in front of said first terminal edge, said platform having no portion of said upper member opposite said platform, said platform adapted for receipt of the flap edge of the lower flap upon the release of the flap edge of the lower flap from a separate flap pull.

2. The closure as described in claim 1, wherein said platform is planar and includes a downwardly turned beveled lip, said platform including said beveled lip being bounded by a portion of a perimeter of said lower member.

3. The closure as described in claim 1, wherein said upper member includes a first overhang, said first overhang extending over a portion of the lower flap when said first terminal edge of said webbed wall engages the flap edge of the lower flap.

4. The closure as described in claim 3, wherein said overhang includes a pull opening, said pull opening adapted to allow a portion of said overhang to by-pass a portion of a separate flap pull.

5. The closure as described in claim 1, wherein a portion of said platform includes a pull opening, said pull opening adapted to allow a portion of said platform portion of said lower member to by-pass a portion of a separate flap pull.

6. The closure as described in claim 1, wherein upon mounting said closure on the first open upper flap, in a configuration such that a first side of said webbed wall is positioned against the flap edge of the first open upper flap and said upper member is positioned against the top of the first open upper flap, and subsequently lowering said closure along with the first open upper flap, said lower member of said closure by-passes the flap edge of the stationary second open upper flap and subsequently a guide portion of said upper member engages the flap edge of the stationary second open upper flap.

7. The closure as described in claim 1, wherein said webbed wall includes the first terminal edge and an opposite second terminal edge and said upper member includes a first overhang and a second overhang, said first overhang extending over a portion of the lower flap when said first terminal edge of said webbed wall engages the flap edge of the lower flap, said second overhang extending over a portion of the lower flap when said second terminal edge engages the flap edge of the lower flap, and wherein a height between said first overhang and said lower member is different from a height between said second overhang and said lower member.

8. The closure as described in claim 1, wherein said first terminal edge is inclined in relation to said lower member.

9. A one-piece closure for containers having first and second upper entry-exit flaps and having at least one lower entry-exit flap, the upper flaps having parallel flap edges, the closure comprising:

an upper member for receipt on top of a portion of the first and second upper flaps;

a lower member for receipt on bottom of a portion of the lower flap;

a webbed wall attached to said upper and lower members and disposed therebetween, said webbed wall dimensioned to fit between the parallel flap edges of the closed upper flaps, said webbed wall having a first terminal edge for engaging a flap edge of the lower flap when securing a portion of the lower flap and a portion of the first and second upper flaps together between said upper member and said lower member;

said upper member including a first overhang, said first overhang extending over a portion of the lower flap when said first terminal edge of said webbed wall engages a flap edge of the first lower flap;

said first overhang including a pull opening, said pull opening adapted to allow a portion of said first overhang to by-pass a portion of a separate flap pull, said lower member including a pull opening, said pull opening adapted to allow a portion of said lower member to by-pass a portion of a separate flap pull.

10. The closure as described in claim 9, wherein said upper member includes a guide, whereupon mounting said closure on the first open upper flap, in a configuration such that a first side of said webbed wall is positioned against the flap edge of the first open upper flap and said upper member is positioned against the top of the first open upper flap, and subsequently lowering said closure along with the first open upper flap, said lower member of said closure by-passes the flap edge of the stationary second open upper flap and subsequently said guide portion of said upper member engages the flap edge of the stationary second open upper flap.

11. The closure as described in claim 9, wherein said lower member includes a downwardly turned beveled lip.

12. The closure as described in claim 9, wherein said webbed wall has a length sufficient to prevent said webbed wall from turning when positioned between the closed upper flaps.

13. The closure as described in claim 9, wherein said first terminal edge is inclined in relation to said lower member.

14. A one-piece closure for containers having first and second upper entry-exit flaps and at least one lower entry-exit flap, the upper flaps having parallel flap edges, the closure comprising:

an upper member for receipt on top of a portion of the first and second upper flaps;

a lower member for receipt on bottom of a portion of the lower flap;

a webbed wall attached to said upper and lower members and disposed therebetween, said webbed wall dimensioned to fit between the flap edges of the closed upper flaps, said webbed wall having a first terminal edge for engaging a flap edge of the closed lower flap;

said upper member including a guide, whereupon mounting said closure on the first open upper flap, in a configuration such that a first side of said webbed wall is positioned against the flap edge of the first open upper flap and said upper member is positioned against the top of the first open upper flap, and subsequently lowering said closure along with the first open upper flap, said lower member of said closure by-passes the flap edge of the stationary second upper flap and said guide portion of said upper member engages the flap edge of the stationary second upper flap.

15. The closure as described in claim 14, wherein said upper and lower members are planar.

16. The closure as described in claim 14, wherein said lower member includes a platform disposed in front of said first terminal edge of said webbed wall, said platform having no portion of said upper member opposite said platform, said platform adapted for receipt of the flap edge of the lower flap upon the release of the lower flap edge from a separate flap pull.

17. The closure as described in claim 14, wherein said webbed wall has a length sufficient to prevent said webbed wall from turning when positioned between the closed upper flaps.

18. The closure as described in claim 14, wherein said lower member includes a downwardly turned beveled lip.

19. The closure as described in claim 14, wherein said first terminal edge is inclined in relation to said lower member.

* * * * *